(12) United States Patent
Tanahashi et al.

(10) Patent No.: US 10,315,477 B2
(45) Date of Patent: Jun. 11, 2019

(54) VEHICULAR SUSPENSION

(71) Applicant: TOYOTA JIDOSHA KABUSHIKI KAISHA, Toyota-shi, Aichi (JP)

(72) Inventors: Toshio Tanahashi, Susono (JP); Yoji Kanehara, Nagoya (JP); Koshi Yamada, Odawara (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 85 days.

(21) Appl. No.: 15/563,242

(22) PCT Filed: Mar. 31, 2016

(86) PCT No.: PCT/JP2016/060729
§ 371 (c)(1),
(2) Date: Sep. 29, 2017

(87) PCT Pub. No.: WO2016/159262
PCT Pub. Date: Oct. 6, 2016

(65) Prior Publication Data
US 2018/0086164 A1 Mar. 29, 2018

(30) Foreign Application Priority Data
Apr. 2, 2015 (JP) ................................. 2015-076074

(51) Int. Cl.
*B60G 7/00* (2006.01)
*B60G 7/02* (2006.01)
(Continued)

(52) U.S. Cl.
CPC .............. *B60G 7/02* (2013.01); *B60G 7/001* (2013.01); *B60G 7/005* (2013.01); *B60R 16/06* (2013.01);
(Continued)

(58) Field of Classification Search
CPC .......... B60G 7/02; B60G 7/005; B60G 7/001; B60G 2204/416; B60G 2200/18;
(Continued)

(56) References Cited

U.S. PATENT DOCUMENTS 3,158,782 A * 11/1964 Maratuech .............. B60C 19/08
361/217
4,647,025 A * 3/1987 Gold ...................... B60G 15/12
267/122
(Continued)

FOREIGN PATENT DOCUMENTS

JP 5-238438 A 9/1993
JP 6-27372 U 4/1994
(Continued)

*Primary Examiner* — Drew J Brown
(74) *Attorney, Agent, or Firm* — Sughrue Mion, PLLC

(57) ABSTRACT

A vehicle suspension in which joint devices are interposed in coupling parts between a vehicle body and links serving as suspension components and coupling parts between the links and a wheel support component. Self-discharge type charge eliminators are provided on a surface of a specific component, which is at least one of the vehicle body, the links, the wheel support component, or the joint devices. The charge eliminator is configured to diselectrify the specific component by changing air around the charge eliminator to a negative air ion and attracting the air ion to positive electric charge of the specific component to neutralize the specific component, to thereby decrease a charge amount of the specific component and decrease charge amounts of rubber bushes and grease in the joint devices.

9 Claims, 16 Drawing Sheets

(51) Int. Cl.
*H05F 3/02* (2006.01)
*H05F 3/04* (2006.01)
*B60R 16/06* (2006.01)

(52) U.S. Cl.
CPC ............... *H05F 3/02* (2013.01); *H05F 3/04* (2013.01); *B60G 2200/18* (2013.01); *B60G 2204/41* (2013.01); *B60G 2204/416* (2013.01)

(58) Field of Classification Search
CPC ....... B60G 2204/41; B60R 16/06; H05F 3/02; H05F 3/04
See application file for complete search history.

(56) References Cited

U.S. PATENT DOCUMENTS

| | | | |
|---|---|---|---|
| 5,754,388 A * | 5/1998 | Schmidt | H05F 3/02 361/215 |
| 10,196,959 B2 * | 2/2019 | Tanahashi | F01N 13/08 |
| 2016/0059838 A1 * | 3/2016 | Yamada | B60T 7/04 180/443 |
| 2016/0192463 A1 * | 6/2016 | Tanahashi | B60K 13/02 361/216 |
| 2016/0208748 A1 * | 7/2016 | Tanahashi | F02M 37/22 |
| 2016/0214453 A1 * | 7/2016 | Tanahashi | B60G 13/08 |
| 2016/0223024 A1 * | 8/2016 | Tanahashi | B60B 27/00 |
| 2016/0230824 A1 * | 8/2016 | Tanahashi | F16D 65/0068 |
| 2016/0280162 A1 | 9/2016 | Yamada et al. | |
| 2017/0057389 A1 * | 3/2017 | Dickerman | B60N 2/70 |

FOREIGN PATENT DOCUMENTS

| | | |
|---|---|---|
| JP | 10-55895 A | 2/1998 |
| JP | 2008-247181 A | 10/2008 |
| JP | 2009-126201 A | 6/2009 |
| JP | 2009-181694 A | 8/2009 |
| JP | 2012245955 A | 12/2012 |
| JP | 3191490 U | 6/2014 |
| JP | 2015-16821 A | 1/2015 |
| WO | 2011/122002 A1 | 10/2011 |
| WO | 2012164373 A1 | 12/2012 |
| WO | 2015/064195 A1 | 5/2015 |

* cited by examiner

VEHICULAR SUSPENSION

CROSS REFERENCE TO RELATED APPLICATIONS

This application is a National Stage of International Application No. PCT/JP2016/060729 filed Mar. 31, 2016, claiming priority based on Japanese Patent Application No. 2015-076074, filed Apr. 2, 2015, the contents of all of which are incorporated herein by reference in their entirety.

TECHNICAL FIELD

The present invention relates to a suspension for a vehicle such as an automobile, and more particularly to a suspension in which a suspension component is coupled to a wheel support component and a vehicle body through intermediation of joint devices such as rubber bush devices.

BACKGROUND ART

Suspensions for suspending wheels are provided for a vehicle such as an automobile. The suspension includes a wheel support component and a suspension component coupled to the wheel support component and a vehicle body. The suspension component needs to swing or pivot with respect to the wheel support component and/or the vehicle body, and is thus coupled to the wheel support component and the vehicle body through intermediation of joint devices each for permitting a relative angle change of a coupled component. As the joint devices, there are used, for example, a bush device incorporating a rubber-like elastic component, a ball joint, and a spherical bearing. In order to particularly suppress transmission of vibration and impact received by the wheel to the vehicle body through the wheel support component and the suspension component, at least one of the wheel support component or the vehicle body is coupled to the suspension component through intermediation of a bush device incorporating a rubber-like elastic component.

Incidentally, when a vehicle such as an automobile travels, static electricity is generated in the vehicle due to the flow of air under a state in which the air is brought into friction contact with the vehicle. Further, static electricity is generated also by repeated contact and separation of each portion of a tire with respect to a road surface along with the rotation of a wheel, by relative movement of components in an engine, a brake device, or the like, and by other causes.

The vehicle is substantially electrically insulated from the ground by a tire having low conductivity. Therefore, when static electricity is generated in the vehicle, a vehicle body or the like is electrified with electric charge (in general, positive electric charge). When the vehicle body or the like is electrified with the electric charge, radio noise is liable to be generated. Therefore, a structure for reducing electric charge that is charged to a vehicle through the passage of an electric current has hitherto been studied, and various structures have been proposed.

For example, in Patent Literature 1 described below, there is disclosed a static electricity eliminator having the following configuration. Charged silicon is filled into a case in which ceramic bodies are radially and densely arranged. One of conductive wires connected to both sides of the case is connected to a minus terminal of a battery, and the other conductive wire is connected to a vehicle body. In this type of the static electricity eliminator, static electricity of the vehicle body is neutralized by grounding, and thus the electric charge with which the vehicle body is electrified can be reduced.

CITATION LIST

Patent Literature

[PTL 1] JP 2009-181694 A

SUMMARY OF INVENTION

Technical Problem

As a result of experimental study conducted by the inventors of the present invention, it was found that an adverse effect on the vehicle caused by electrification of the vehicle with electric charge is not limited to tendency of generation of radio noise and the like. Specifically, it was found that, when the vehicle is electrified with the electric charge, the rubber-like elastic component of the bush device is also electrified with the electric charge, and the rubber-like elastic component is reduced in elasticity and is thus hardened, with the result that the vibration and the impact become more liable to be transmitted to the vehicle body through the bush device, and there is influence on easiness of the relative angle change of the coupled component. Moreover, grease is applied to the ball joint and the spherical bearing so as to reduce friction of components of the ball joint and the spherical bearing. It was found that, when the vehicle is electrified with the electric charge, the grease is also electrified with the electric charge, and viscosity of the grease increases, with the result that lubrication performance of the grease is degraded, and there is influence on the easiness of the relative angle change of the coupled component.

Even when the electric charge with which the vehicle body is electrified is reduced by the related-art static electricity eliminator disclosed in Patent Literature 1, the electric charge with which the rubber-like elastic component of the bush device is electrified cannot effectively be reduced. Therefore, the reduction in elasticity of the rubber-like elastic component and the increase in viscosity of the grease caused by the electrification with the electric charge cannot be suppressed by the related-art static electricity eliminator. Thus, the increase in the tendency of the transmission of the vibration from the wheel to the vehicle body through the bush device cannot be suppressed, and the influence on the easiness of the relative angle change of the coupled component cannot be suppressed.

The present invention has been made in view of the above-mentioned phenomenon and the cause of the phenomenon, which have not hitherto been recognized. Further, it is a primary object of the present invention to prevent excessive electrification of a joint device with electric charge, to thereby suppress degradation in performance of the joint device, which is caused by the electrification with the electric charge.

Solution to Problem and Advantageous Effects of Invention

According to one embodiment of the present invention, there is provided a vehicle suspension, which is to be applied to a vehicle including a vehicle body that is electrically insulated from a ground by a tire having low conductivity and is electrified with positive electric charge through travel, the vehicle suspension including: a wheel support component; and a suspension component coupled to the wheel support component and the vehicle body, in which a joint device for permitting a relative angle change of a coupled component is interposed in at least one of a coupling part between the vehicle body and the suspension component or a coupling part between the suspension component and the wheel support component, and in which a self-discharge type charge eliminator is provided on a surface of a specific component, which is at least one of the vehicle body, the suspension component, the wheel support component, or the joint device.

The self-discharge type charge eliminator is an air-ion conversion self-discharge type charge eliminator which is configured to diselectrify the specific component by changing air around the self-discharge type charge eliminator to a negative air ion in accordance with a charge amount of positive electric charge with which the specific component is electrified and attracting the negative air ion to the positive electric charge of the specific component to neutralize the specific component, to thereby decrease the charge amount of the specific component and decrease a charge amount of a rubber-like elastic component of the joint device.

A reason for the electrification of the rubber-like elastic component of the bush device and the like with the electric charge as a result of electrification of the vehicle body and the like with the electric charge, and a cause of such a phenomenon that the rubber-like elastic component is reduced in elasticity and hardened as a result of the electrification with the electric charge are not completely clear. However, the main reason and cause are considered as follows. The suspension component is coupled to the wheel support component and the vehicle body, and the joint devices are interposed in coupling parts of the suspension component. Therefore, when the vehicle body, the wheel support component, and the like are electrified with the electric charge, the suspension component is also electrified with the electric charge. When the amount of the electric charge with which the suspension component is electrified increases, the electric charge partially moves to the joint devices, with the result that the rubber-like elastic component and the grease are electrified with the electric charge. It is assumed that, when the rubber-like elastic component is electrified with the electric charge, the degree of freedom of molecules of the rubber-like elastic component is reduced, with the result that the elasticity of the rubber-like elastic component is reduced. Similarly, it is assumed that, when the grease is electrified with the electric charge, the degree of freedom of molecules of the grease is reduced, with the result that the viscosity of the grease is increased.

According to the above-mentioned configuration, at least one of the wheel support component or the vehicle body is coupled to the suspension component through intermediation of the joint device for permitting the relative angle change of the suspension component. The self-discharge type charge eliminator is provided on the surface of the specific component, which is at least one of the vehicle body, the suspension component, the wheel support component, or the joint devices. The charge eliminator is configured to diselectrify the specific component by changing air around the charge eliminator to a negative air ion and attracting the negative air ion to the positive electric charge of the specific component to neutralize the specific component, to thereby decrease the charge amount of the specific component. Therefore, the electric charge with which the rubber-like elastic component and the grease are electrified moves to the specific component. Thus, the charge amount of the rubber-like elastic component and the grease is decreased, thereby being capable of suppressing the reduction in elasticity of the rubber-like elastic component, which results in the hardening of the rubber-like elastic component, and the increase in viscosity of the grease, which results in the degradation in lubrication performance of the grease, which are caused by the electrification with the electric charge. Thus, the increase in the tendency of the transmission of the vibration from the wheel to the vehicle body through the bush devices, and the influence on the easiness of the relative angle change of the coupled component can be suppressed.

According to the above-mentioned configuration, a static electricity eliminator having a complicated structure is not required, and it is not required to connect the static electricity eliminator to a minus terminal of a battery and to a vehicle body through conductive wires. Further, the self-discharge type charge eliminator may be, for example, a thin conductive body capable of performing so-called self-discharge through use of electric charge with which the specific component is electrified, and hence a large space as in the case of installing the static electricity eliminator is not required.

According to one embodiment of the present invention, the suspension component is a suspension arm, the joint device is a bush device, which is interposed between the vehicle body and the suspension arm and incorporates a rubber-like elastic component, and the self-discharge type charge eliminator is provided on a surface of at least one of the vehicle body, the suspension arm, or the bush device.

According to the above-mentioned configuration, the bush device serving as the joint device is interposed between the vehicle body and the suspension arm, and the self-discharge type charge eliminator is provided on the surface of the specific component, which is at least one of the vehicle body, the suspension arm, or the bush device. Thus, the specific component, that is, at least one of the vehicle body, the suspension arm, or the bush device, is diselectrified by the self-discharge type charge eliminator, and the electric charge with which the rubber-like elastic component of the bush device is electrified moves to the specific component, thereby being capable of decreasing the charge amount of the rubber-like elastic component. Thus, the reduction in elasticity and resulting hardening of the rubber-like elastic component can be suppressed. Further, the increase in the tendency of the transmission of the vibration and the impact to the vehicle body through the bush device, and the influence on the easiness of the relative angle change of the coupled component can be suppressed.

Further, according to another embodiment of the present invention, the suspension component is a suspension arm, the joint device is a bush device, which is interposed between the suspension arm and the wheel support component and incorporates a rubber-like elastic component, and the self-discharge type charge eliminator is provided on a surface of at least one of the suspension arm, the wheel support component, or the bush device.

According to the above-mentioned configuration, the bush device serving as the joint device is interposed between suspension arm and the wheel support component, and the self-discharge type charge eliminator is provided on the surface of the specific component, which is at least one of the suspension arm, the wheel support component, or the bush device. Thus, the specific component, that is, at least one of the suspension arm, the wheel support component, or the bush device, is diselectrified by the self-discharge type charge eliminator, and the electric charge with which the rubber-like elastic component of the bush device is electrified moves to the specific component, thereby being capable of decreasing the charge amount of the rubber-like elastic component. Thus, the reduction in elasticity and resulting hardening of the rubber-like elastic component can be suppressed. Further, the increase in the tendency of the transmission of the vibration and the impact to the vehicle body through the bush device, and the influence on the easiness of the relative angle change of the coupled component can be suppressed.

Further, according to another embodiment of the present invention, the vehicle body includes a vehicle body main part and a sub frame coupled to the vehicle body main part, the suspension component is a suspension arm coupled to the sub frame, the joint device is a bush device, which is interposed between the sub frame and the suspension arm and incorporates a rubber-like elastic component, and the self-discharge type charge eliminator is provided on a surface of at least one of the sub frame, the suspension arm, or the bush device.

According to the above-mentioned configuration, the bush device serving as the joint device is interposed between the sub frame and the suspension arm, and the self-discharge type charge eliminator is provided on the surface of the specific component, which is at least one of the sub frame, the suspension arm, or the bush device. Thus, the specific component, that is, at least one of the sub frame, the suspension arm, or the bush device, is diselectrified by the self-discharge type charge eliminator, and the electric charge with which the rubber-like elastic component of the bush device is electrified moves to the specific component, thereby being capable of decreasing the charge amount of the rubber-like elastic component. Thus, the reduction in elasticity and resulting hardening of the rubber-like elastic component can be suppressed. Further, the increase in the tendency of the transmission of the vibration and the impact received by the wheel to the vehicle body through the bush device, and the influence on the easiness of the relative angle change of the coupled component can be suppressed.

Further, according to another embodiment of the present invention, the suspension component is a suspension arm, the joint device is a ball joint which is interposed in at least one of a coupling part between the vehicle body and the suspension arm or a coupling part between the suspension arm and the wheel support component, and the self-discharge type charge eliminator is provided on a surface of at least one of the suspension arm, the wheel support component, or the ball joint.

According to the above-mentioned configuration, the ball joint serving as the joint device is interposed in at least one of the part between the vehicle body and the suspension arm or the part between the suspension arm and the wheel support component, and the self-discharge type charge eliminator is provided on the surface of the specific component, which is at least one of the suspension arm, the wheel support component, or the ball joint. Thus, the specific component, that is, at least one of the suspension arm, the wheel support component, or the ball joint, is diselectrified by the self-discharge type charge eliminator, and the electric charge with which the grease of the ball joint is electrified moves to the specific component, thereby being capable of decreasing the charge amount of the grease. Thus, the increase in viscosity of the grease and resulting degradation in lubrication performance can be suppressed, thereby being capable of suppressing the influence on the easiness of the relative angle change of the suspension arm, that is, the easiness of the swing or the pivot.

Further, according to another embodiment of the present invention, the suspension component is a suspension arm, the joint device is a spherical bearing, which is interposed in at least one of a coupling part between the vehicle body and the suspension arm or a coupling part between the suspension arm and the wheel support component, and the self-discharge type charge eliminator is provided on a surface of at least one of the suspension arm, the wheel support component, or the spherical bearing.

According to the above-mentioned configuration, the spherical bearing serving as the joint device is interposed in at least one of the part between the vehicle body and the suspension arm or the part between the suspension arm and the wheel support component, and the self-discharge type charge eliminator is provided on the surface of the specific component, which is at least one of the suspension arm, the wheel support component, or the spherical bearing. Thus, the specific component, that is, at least one of the suspension arm, the wheel support component, or the spherical bearing, is diselectrified by the self-discharge type charge eliminator, and the electric charge with which the grease in the spherical bearing is electrified moves to the specific component, thereby being capable of decreasing the charge amount of the grease. Thus, the increase in viscosity of the grease and resulting degradation in lubrication performance can be suppressed, thereby being capable of suppressing the influence on the easiness of the relative angle change of the suspension arm, that is, the easiness of the swing or the pivot.

Further, according to another embodiment of the present invention, the vehicle body main part and the sub frame are coupled to each other through intermediation of a first auxiliary bush device incorporating a rubber-like elastic component, a first auxiliary self-discharge type charge eliminator is provided on a surface of at least one of the vehicle body main part, the sub frame, or the first auxiliary bush device, and the first auxiliary self-discharge type charge eliminator is the air-ion conversion self-discharge type charge eliminator.

According to the above-mentioned configuration, the vehicle body main part and the sub frame are coupled to each other through intermediation of the first auxiliary bush device incorporating the rubber-like elastic component. The first auxiliary self-discharge type charge eliminator, which is the air-ion conversion self-discharge type charge eliminator, is provided on the surface of at least one of the vehicle body main part, the sub frame, or the first auxiliary bush device. Thus, at least one of the vehicle body main part, the sub frame, or the first auxiliary bush device is diselectrified by the first auxiliary self-discharge type charge eliminator, thereby being capable of causing the electric charge with which the rubber-like elastic component of the first auxiliary bush device is electrified to be moved to the diselectrified component. Thus, the charge amount of the rubber-like elastic component of the first auxiliary bush device can be decreased, thereby being capable of suppressing the reduction in elasticity and resulting hardening of the rubber-like elastic component and suppressing the increase in the tendency of the transmission of the vibration of the sub frame to the vehicle body main part through the bush device.

Further, according to another embodiment of the present invention, a differential device is coupled to the sub frame through a second auxiliary bush device incorporating a rubber-like elastic component, a second auxiliary self-discharge type charge eliminator is provided on a surface of at least one of the sub frame, the differential device, or the second auxiliary bush device, and the second auxiliary self-discharge type charge eliminator is the air-ion conversion self-discharge type charge eliminator.

According to the above-mentioned configuration, the differential device is coupled to the sub frame through intermediation of the second auxiliary bush device incorporating the rubber-like elastic component. The second auxiliary self-discharge type charge eliminator, which is the air-ion conversion self-discharge type charge eliminator, is provided on the surface of at least one of the sub frame, the differential device, or the second auxiliary bush device. Thus, at least one of the sub frame, the differential device, or the second auxiliary bush device is dielectrified by the second auxiliary self-discharge type charge eliminator, thereby being capable of causing the electric charge with which the rubber-like elastic component of the second auxiliary bush device is electrified to be moved to the dielectrified component. Thus, the charge amount of the rubber-like elastic component of the second auxiliary bush device can be decreased, thereby being capable of suppressing the reduction in elasticity and resulting hardening of the rubber-like elastic component and suppressing the increase in the tendency of the transmission of the vibration of the differential device to the sub frame through the bush device.

Further, according to another embodiment of the present invention, a cover made of resin is mounted to the suspension arm, a third auxiliary self-discharge type charge eliminator is provided on a surface of the cover, and the third auxiliary self-discharge type charge eliminator is the air-ion conversion self-discharge type charge eliminator.

According to the above-mentioned configuration, the cover is mounted to the suspension arm, and the cover is made of resin, which is more liable to be electrified with the electric charge than metal. The third auxiliary self-discharge type charge eliminator, which is the air-ion conversion self-discharge type charge eliminator, is provided on the surface of the cover. Thus, the cover can efficiently be dielectrified by the third auxiliary self-discharge type charge eliminator, and the electric charge with which the suspension arm is electrified moves to the cover, thereby being capable of causing the electric charge with which the rubber-like elastic component of the bush device is electrified to be moved to the suspension arm. Thus, the charge amount of the rubber-like elastic component of the bush device can be decreased, thereby being capable of suppressing the reduction in elasticity and resulting hardening of the rubber-like elastic component and effectively suppressing the increase in the tendency of the transmission of the vibration and the shock received by the wheel to the vehicle body through the bush device.

Further, according to another embodiment of the present invention, the self-discharge type charge eliminator includes: a conductive metal foil having a large number of minute protrusions and recesses on a side surface of an outer periphery of the conductive metal foil; and a layer of a pressure-sensitive adhesive applied to one surface of the metal foil, and the self-discharge type charge eliminator is fixed to the specific component by bonding of the layer of the pressure-sensitive adhesive.

According to the above-mentioned configuration, the metal foil for the dielectrification can easily be fixed by the bonding to the surface of the specific component. Further, the layer of the pressure-sensitive adhesive has conductivity, and the electric charge can thus effectively be moved from the specific component to the metal foil as compared with a case where the layer of the pressure-sensitive adhesive does not have the conductivity, thereby improving the effect of the dielectrification.

BRIEF DESCRIPTION OF DRAWINGS

FIG. 12 are schematic explanatory views for illustrating a mechanism of dielectrification by the self-discharge type charge eliminator, in which FIG. 12(A) is a sectional view, and FIG. 12(B) is a plan view.

DESCRIPTION OF EMBODIMENTS

Now, with reference to the accompanying drawings, preferred embodiments of the present invention are described in detail.

First Embodiment

Figure 1:
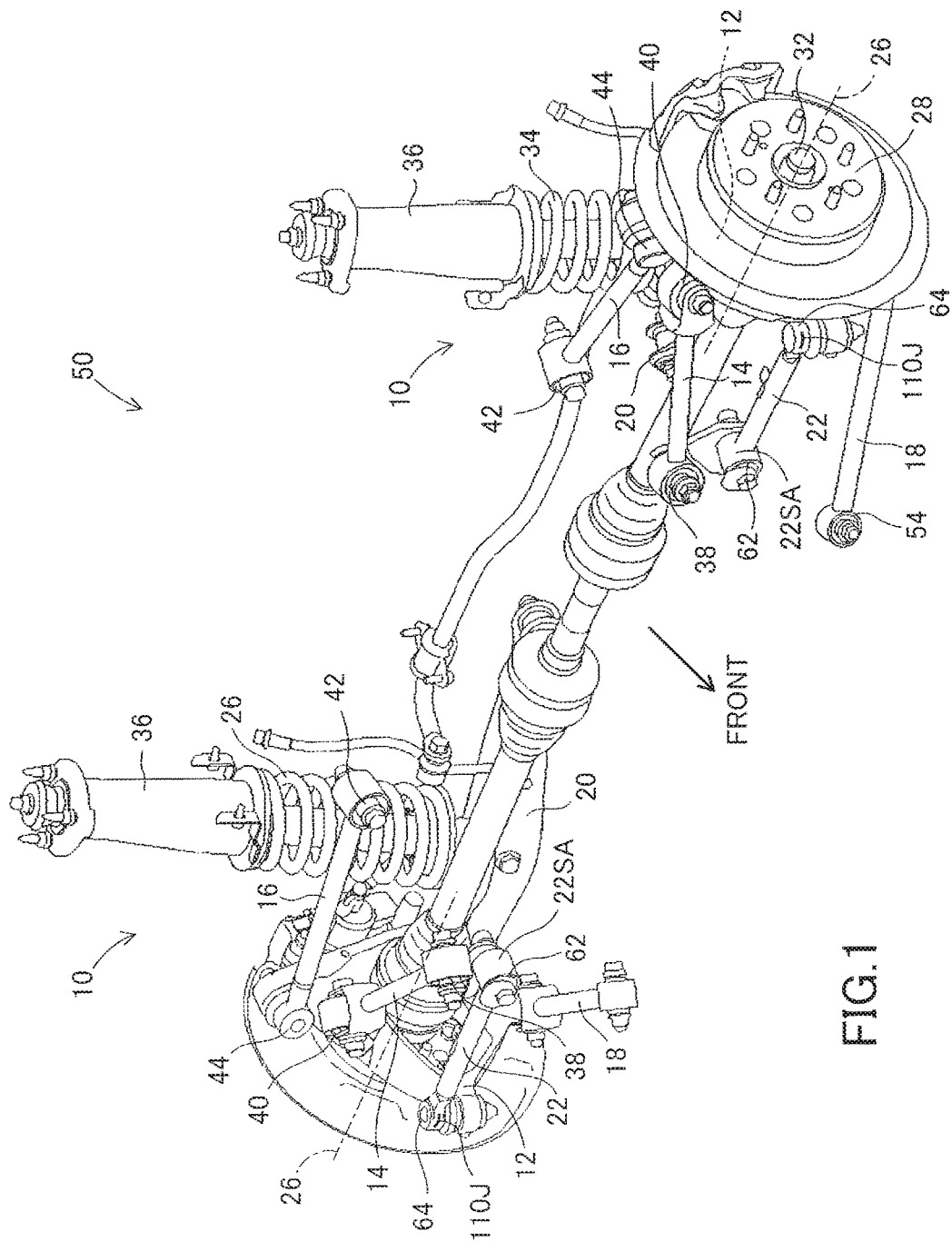
FIG. 1 is a perspective view for illustrating a suspension according to a first embodiment of the present invention applied to a multi-link rear suspension, as viewed obliquely from a front of a vehicle.
Figure 2:
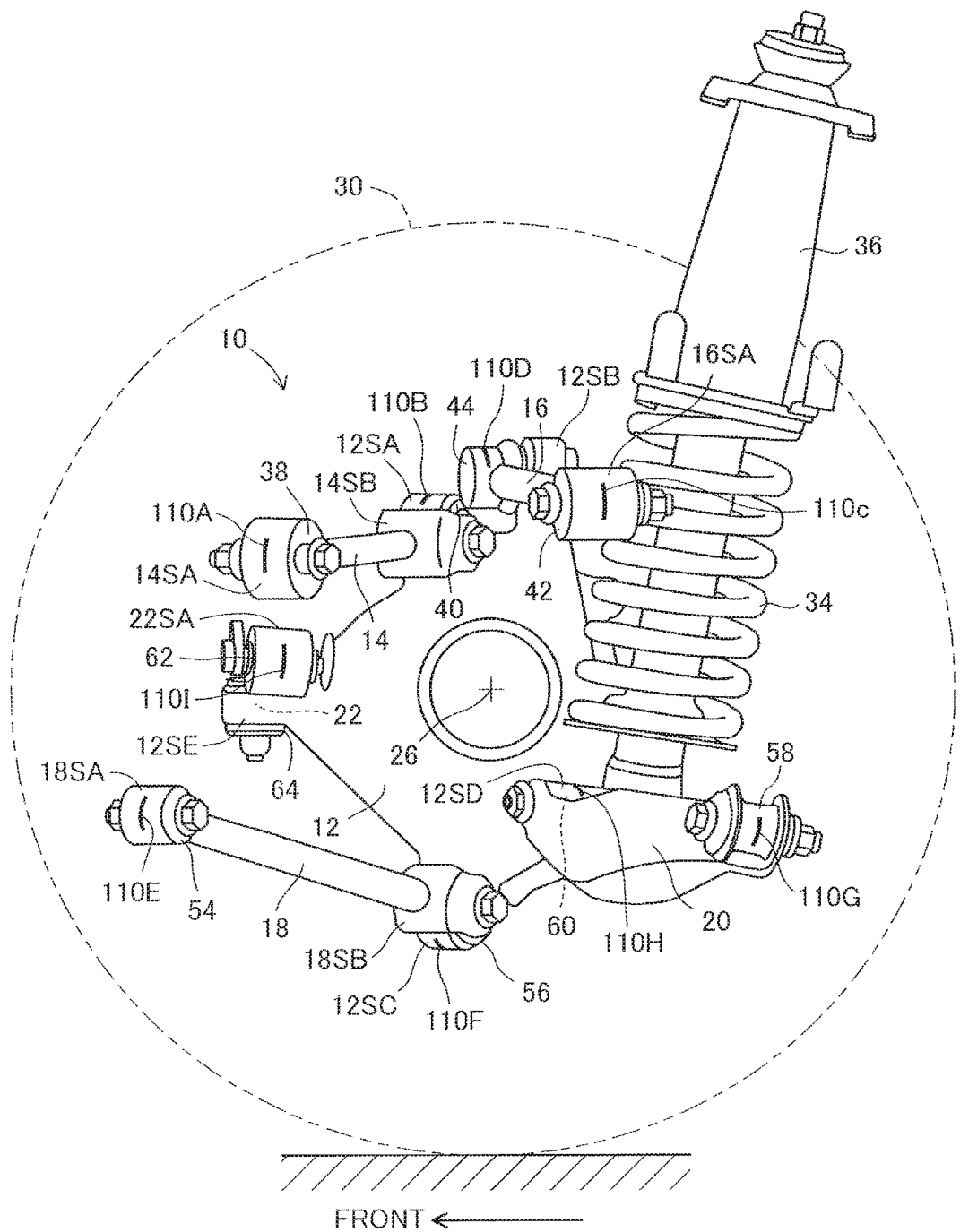
FIG. 2 is a side view for illustrating the suspension illustrated in FIG. 1 as viewed laterally outward of the vehicle.
Figure 3:
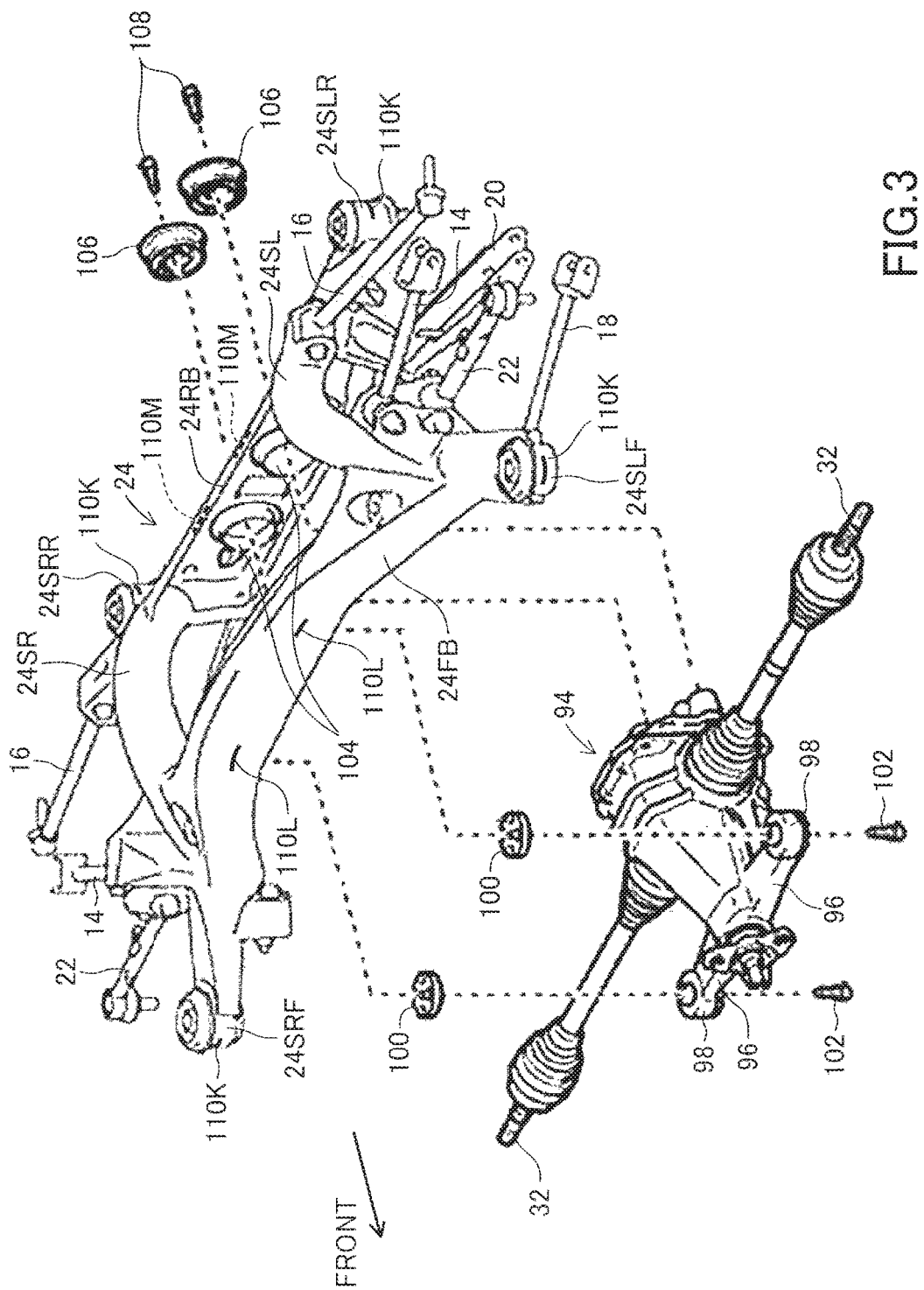
FIG. 3 is an exploded perspective view for illustrating main components of the suspension illustrated in FIG. 1 together with a differential gear device.

FIG. 1 to FIG. 10 are views for illustrating a suspension 10 according to a first embodiment of the present invention applied to a multi-link rear suspension and components thereof. In FIG. 1 to FIG. 3, "FRONT" indicates a front side of a vehicle 50. In each of FIG. 4 to FIG. 9 described later, a part of hatching indicating a cross section is omitted in order to avoid complexity.

In those drawings, the suspension 10 is provided for each of right and left wheels (rear wheels) 30 of the vehicle 50, and each suspension 10 includes a wheel support component (knuckle) 12 and five links 14 to 22. The links 14 to 22 are suspension components which are coupled to the wheel support component 12 and a suspension member 24 (see FIG. 3) forming a part of a vehicle body. The wheel support component 12 is configured to support an axle hub 28 so as to be rotatable about a rotation axis 26 through intermediation of a bearing (not shown). A wheel 30 (see FIG. 2) is mounted to the axle hub 28 in a well-known manner, and the wheel 30 is configured to be driven by a drive shaft 32 through intermediation of the axle hub 28.

Components described herein are made of conductive metal such as steel or aluminum alloy unless a material for components is particularly mentioned. Further, a portion of the metal component exposed to the atmosphere is coated as needed in order to improve durability, and a surface of the coated portion is covered with a non-conductive coating film.

The links 14 and 16 are upper links having an I shape and being arranged on a front side and a rear side, respectively. The links 18 and 20 are lower links having an I shape and being arranged on a front side and a rear side, respectively. The link 22 is a toe control link having an I shape. The links 14 to 22 function as suspension arms. A main component of each of the links 14 to 18 and 22 is formed of a steel pipe, and the link 20 is formed of a press-formed steel plate having a substantially staple-shaped cross section which is opened upward. The link 20 is urged downward by a compression coil spring 34 serving as a suspension spring. The compression coil spring 34 is provided integrally with a shock absorber 36, but may be replaced by, for example, a torsion spring or the like which is independent of the shock absorber 36.

The link 14 is coupled so as to be swingable to the suspension member 24 at an inner end through intermediation of a rubber bush device 38, and is coupled so as to be swingable to the wheel support component 12 at an outer end through intermediation of a rubber bush device 40. The link 16 is coupled so as to be swingable to the suspension member 24 at an inner end through intermediation of a rubber bush device 42, and is coupled so as to be pivotable to the wheel support component 12 at an outer end through intermediation of a ball joint 44.

Figure 4:
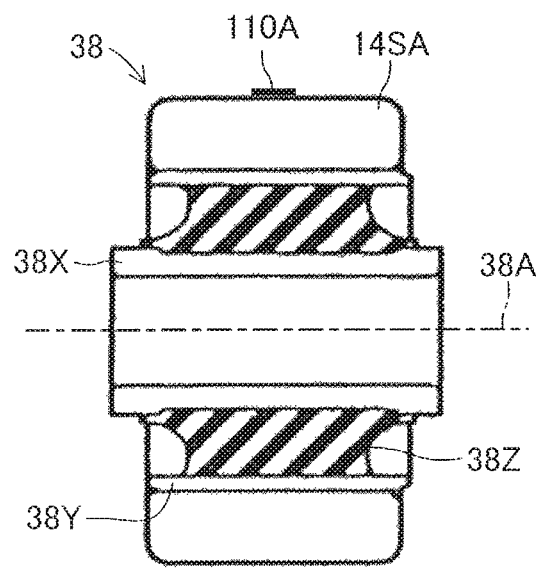
FIG. 4 is a sectional view for illustrating a rubber bush device at an inner end of an upper link on a front side illustrated in FIG. 1.

As illustrated in FIG. 4, the rubber bush device 38 includes an inner sleeve 38X, an outer sleeve 38Y, and a rubber bush 38Z. The inner sleeve 38X and the outer sleeve 38Y have a common axis 38A. The rubber bush 38Z is arranged between the inner sleeve 38X and the outer sleeve 38Y. The inner sleeve 38X is mounted to a bracket of the suspension member 24 by a bolt inserted into the inner sleeve 38X and a nut threadedly engaged with the bolt. The outer sleeve 38Y is arranged in a sleeve part 14SA provided at the inner end of the link 14, and is fixed to the sleeve part 14SA by press-fitting.

Figure 5:
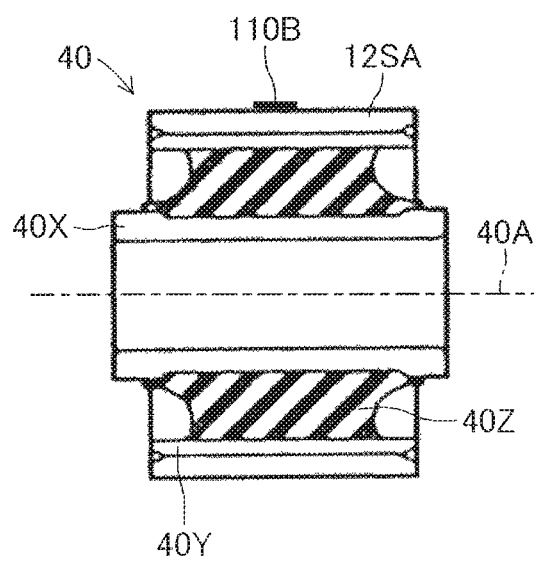
FIG. 5 is a sectional view for illustrating a rubber bush device at an outer end of the upper link on the front side illustrated in FIG. 1.

As illustrated in FIG. 5, the rubber bush device 40 includes an inner sleeve 40X, an outer sleeve 40Y, and a rubber bush 40Z. The inner sleeve 40X and the outer sleeve 40Y have a common axis 40A. The rubber bush 40Z is arranged between the inner sleeve 40X and the outer sleeve 40Y. The inner sleeve 40X is mounted to a yoke part 14SB (see FIG. 2) provided at an outer end of the link 14 by a bolt inserted into the inner sleeve 40X and a nut threadedly engaged with the bolt. The outer sleeve 40Y is arranged in a sleeve part 12SA provided on the wheel support component 12, and is fixed to the sleeve part 12SA by press-fitting.

Figure 6:
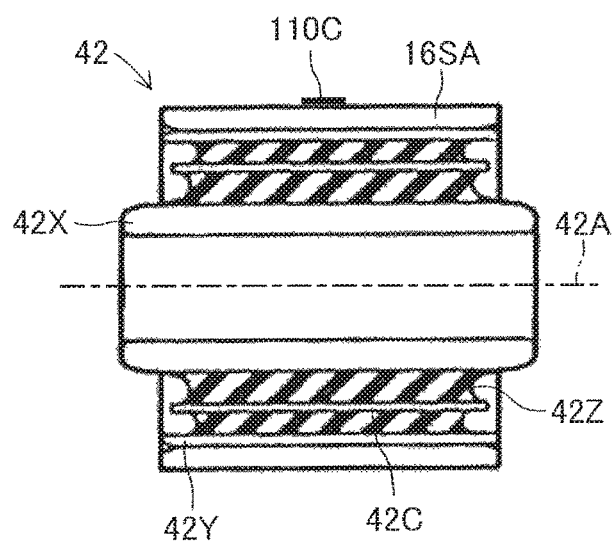
FIG. 6 is a sectional view for illustrating a rubber bush device at an inner end of an upper link on a rear side illustrated in FIG. 1.

As illustrated in FIG. 6, the rubber bush device 42 includes an inner sleeve 42X, an outer sleeve 42Y, and a rubber bush 42Z. The inner sleeve 42X and the outer sleeve 42Y have a common axis 42A. The rubber bush 42Z is arranged between the inner sleeve 42X and the outer sleeve 42Y. In the illustrated embodiment, a cylinder body 42C is embedded in the rubber bush 42Z. The inner sleeve 42X is mounted to a bracket of the suspension member 24 as in the rubber bush device 38. The outer sleeve 42Y is arranged in a sleeve part 16SA provided at an inner end of the link 16, and is fixed to the sleeve part 16SA by press-fitting.

Figure 7:
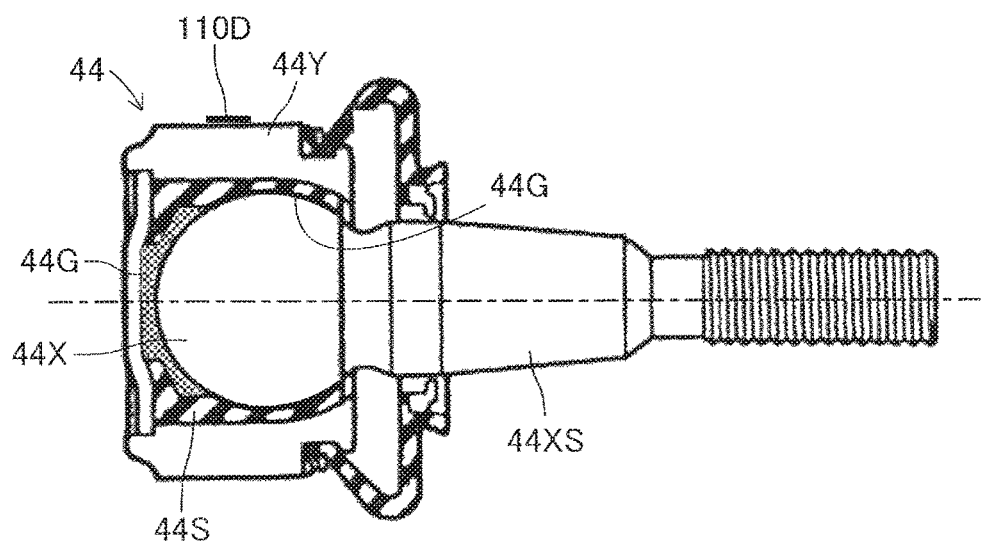
FIG. 7 is a sectional view for illustrating a ball joint at an outer end of the upper link on the rear side illustrated in FIG. 1.

As illustrated in FIG. 7, the ball joint 44 includes a ball component 44X and a socket 44Y for supporting the ball component 44X so as to be pivotable, and the socket 44Y is formed integrally with the outer end of the link 16. A seat component 44S made of resin is interposed between a ball part of the ball component 44X and the socket 44Y, and a slide part between the ball part and the seat component 44S is lubricated with grease 44G. The ball component 44X includes a stem part 44XS, and the stem part 44XS is mounted to a sleeve part 12SB (see FIG. 2) provided on the wheel support component 12.

The link 18 is coupled so as to be swingable to the suspension member 24 at an inner end through intermediation of a rubber bush device 54, and is coupled so as to be swingable to the wheel support component 12 at an outer end through intermediation of a rubber bush device 56. The link 20 is coupled so as to be swingable to the suspension member 24 at an inner end through intermediation of a rubber bush device 58, and is coupled so as to be pivotable to the wheel support component 12 at an outer end through intermediation of a pillow ball joint (spherical bearing) 60.

Although detailed illustration is not made in the drawings, the rubber bush device 54 has the same structure as that of the rubber bush device 38, and an inner sleeve is mounted to a bracket of the suspension member 24. An outer sleeve is arranged in a sleeve part 18SA (see FIG. 2) provided at an inner end of the link 18, and is fixed to the sleeve part 18SA by press-fitting. The rubber bush device 56 has the same structure as that of the rubber bush device 40, and an inner sleeve is mounted to a yoke part 18SB (see FIG. 2) provided at an outer end of the link 18. An outer sleeve is arranged in a sleeve part 12SC (see FIG. 2) provided on the wheel support component 12, and is fixed to the sleeve part 12SC by press-fitting.

Figure 8:
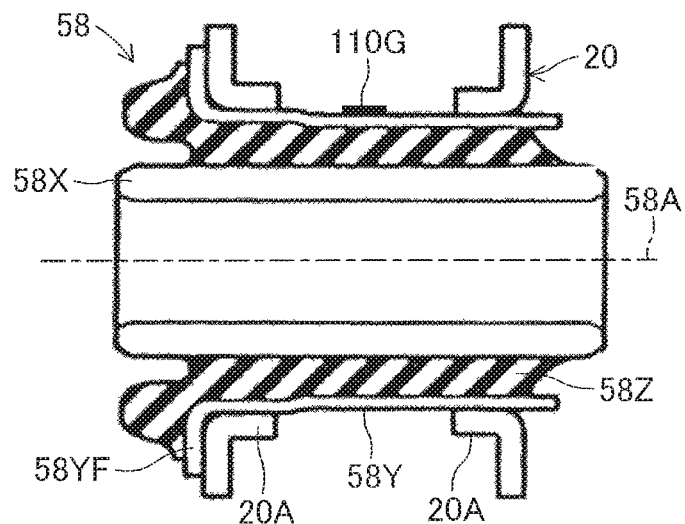
FIG. 8 is a sectional view for illustrating a rubber bush device at an inner end of a lower link on a rear side illustrated in FIG. 1.

As illustrated in FIG. 8, the rubber bush device 58 includes an inner sleeve 58X, an outer sleeve 58Y, and a rubber bush 58Z. The inner sleeve 58X and the outer sleeve 58Y have a common axis 58A. The rubber bush 58Z is arranged between the inner sleeve 58X and the outer sleeve 58Y. The inner sleeve 58X is mounted to a bracket of the suspension member 24 as in the rubber bush device 38. The outer sleeve 58Y is arranged in a cylinder part 20A, which is formed at a part located at the inner end of the link 20 and extending in parallel with each other, and is fixed to the cylinder part 20A by press-fitting. In particular, in the illustrated embodiment, the outer sleeve 58Y includes a flange part 58YF extending in a direction perpendicular to the axis on a vehicle front side, and the rubber bush 58Z extends to the vehicle front side of the flange part 58YF.

Figure 9:
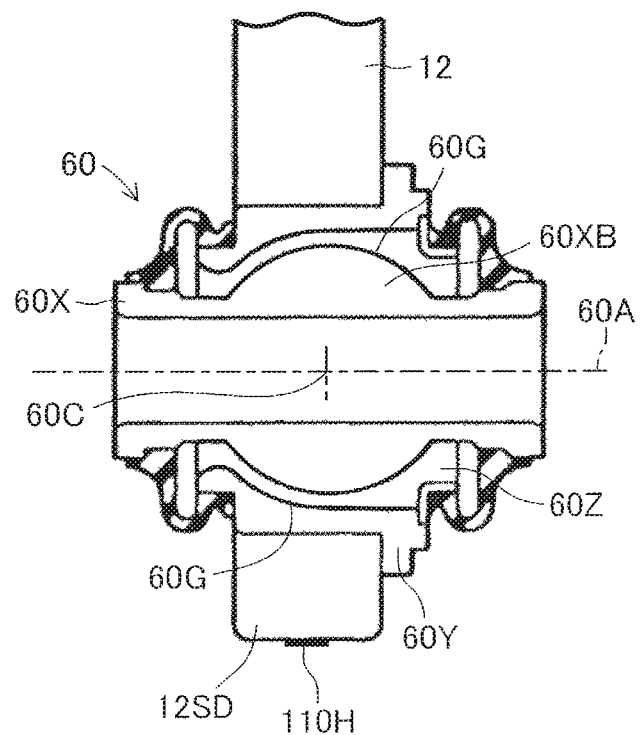
FIG. 9 is a sectional view for illustrating a pillow ball joint at the outer end of the lower link on the rear side illustrated in FIG. 1.

As illustrated in FIG. 9, the pillow ball joint 60 includes an inner ring component 60X and an outer ring component 60Y. The inner ring component 60X includes a ball shape part 60XB. The outer ring component 60Y is configured to support the inner ring component 60X so as to be rotatable about an axis 60A through intermediation of a seat 60Z made of resin. Slide parts between the seat 60Z and the inner ring component 60X and between the seat 60Z and the outer ring component 60Y are lubricated with grease 60G. The inner ring component 60X and the outer ring component 60Y can pivot relative to each other about a center 60C of the ball shape part 60XG positioned on the axis 60A within an extremely limited range. The inner ring component 60X is mounted to an outer end of the link 20 by a bolt inserted into the inner ring component 60X and a nut threadedly engaged with the bolt. The outer ring component 60Y is arranged in a sleeve part 12SD provided on the wheel support component 12, and is fixed to the sleeve part 12SD by press-fitting.

As in the link 18, the link 22 is coupled so as to be swingable to the suspension member 24 at an inner end through intermediation of a rubber bush device 62, and is coupled so as to be pivotable to the wheel support component 12 at an outer end through intermediation of a ball joint 64. The rubber bush device 62 has the same structure as that of the rubber bush device 38, and an inner sleeve is mounted to a bracket of the suspension member 24. An outer sleeve is arranged in a sleeve part 22SA (see FIG. 2) provided at an inner end of the link 22, and is fixed to the sleeve part 22SA by press-fitting. The ball joint 64 has the same structure as that of the ball joint 44, and a socket is formed integrally with an outer end of the link 22. A slide part between a ball part and a seat component is lubricated with grease, and a stem part of the ball component is mounted to a sleeve part 12SE (see FIG. 2) provided on the wheel support component 12.

The rubber bush device such as the rubber bush device 38 described above permits, through elastic deformation of the rubber bush, the swing of each of the links 14 to 22 about the corresponding axis with respect to the wheel support component 12 or the suspension member 24. Moreover, the rubber bush device permits, through the elastic deformation of the rubber bush, a motion other than the swing about the axis of each of the links 14 to 22 within an extremely limited range with respect to the wheel support component 12 or the suspension members 24. Further, the rubber bush device is configured to suppress, through internal friction of the rubber bush, transmission of vibration and impact between each of the links 14 to 22 and the wheel support component 12 or the suspension member 24.

As illustrated in FIG. 3, the suspension member 24 has a substantially ladder shape as viewed from above. In other words, the suspension member 24 includes side beams 24SL and 24SR, which are arranged so as to be separated from each other in a lateral direction of the vehicle and extend in a front-and-rear direction of the vehicle, and a front beam 24FB and a rear beam 24RB, which are arranged so as to be separated from each other in the front-and-rear direction of the vehicle and extend in the lateral direction of the vehicle. The front beam 24FB and the rear beam 24RB integrally connect the side beams 24SL and 24SR to each other. Center parts of the side beams 24SL and 24SR curve upward and toward such directions as to approach each other, and the inner ends of the links 14 to 22 are coupled to the side beams 24SL and 24SR.

The suspension member 24 includes coupling parts 24SLF and 24SLR at a front end and a rear end of the side beam 24SL, and coupling parts 24SRF and 24SRR at a front end and a rear end of the side beam 24SR. The suspension member 24 is coupled to a vehicle body main part 66 (see FIG. 10) at the four coupling parts 24SLF, 24SLR, 24SRF, and 24SRR. The four coupling parts 24SLF, 24SLR, 24SRF, and 24SRR have coupling structures substantially the same as one another. Therefore, description is thus made of the coupling structure of the coupling part 24SLR, and description of the coupling structures of the other coupling parts is omitted.

Figure 10:
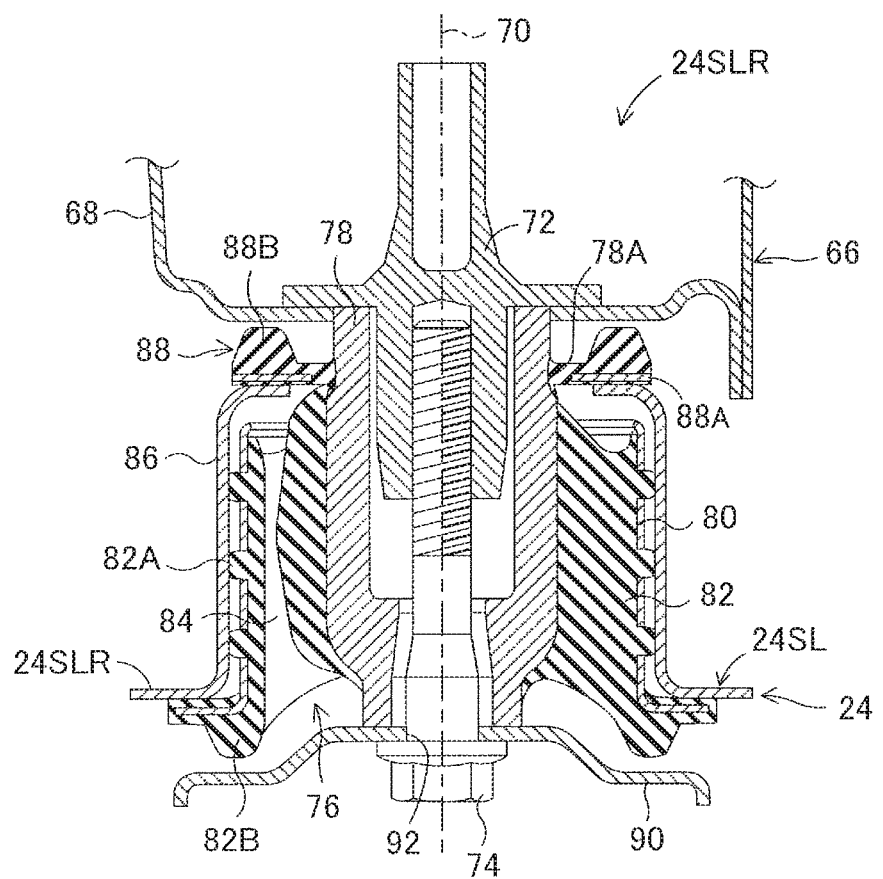
FIG. 10 is an enlarged vertical sectional view for illustrating a coupling structure at a rear end of a side beam to a vehicle body main part.

FIG. 10 is an illustration of the coupling structure of the coupling part 24SLR, specifically, the coupling structure of the rear end of the side beam 24SL with respect to the body main part 66. A left half of FIG. 10 corresponds to a cross section which is taken along the front-and-rear direction of the vehicle, and a right half corresponds to a cross section which is taken along the lateral direction of the vehicle.

In FIG. 10, the vehicle body main part 66 includes a rear floor cross member 68. A nut component 72 extending along an axis 70 is fixed by welding to the rear floor cross member 68. A rubber bush device 76 is mounted to a bottom surface of the rear floor cross member 68 by a bolt 74 threadedly engaging with the nut component 72. The rubber bush device 76 includes an inner sleeve 78, an outer sleeve 80, and a rubber bush 82. The inner sleeve 78 and the outer sleeve 80 extend along the axis 70. The rubber bush 82 is filled between the inner sleeve 78 and the outer sleeve 80. Hollow parts (voids) 84 are provided in the rubber bush 82 at positions in the front-and-rear direction of the vehicle with respect to the axis 70.

A cylinder body 86 provided in the coupling part 24SLR on the rear side of the suspension member 24 is coaxially and loosely fit to the outer sleeve 80, and parts of a space between the cylinder body 86 and the outer sleeve 80 are partially filled with protruding parts 82A of the rubber bush 82, which pass through a plurality of holes provided in the outer sleeve 80 and protrude radially outward. The rubber bush device 76 is configured to suppress transmission of the vibration and the impact from the suspension member 24 to the vehicle body main part 66. In the illustrated embodiment, the rubber bush device 76 is mounted to the suspension member 24 on the side of the outer sleeve, but may be mounted to the suspension member 24 on the side of the inner sleeve.

A top end of the cylinder body 86 has a ring shape extending in a direction perpendicular to the axis 70, and a buffer component 88 having a ring shape fit to a groove part 78A of the inner sleeve 78 is held in abutment against a top surface of the part forming the ring shape. The buffer component 88 includes an annular plate 88A and a rubber part 88B for covering the annular plate 88A. The rubber part 88B includes an annular protruding part, which extends in an annular shape about the axis 70 and protrudes toward a bottom surface of the rear floor cross member 68. Thus, the rubber part 88B is configured to suppress an excessive inclination of the cylinder body 86 as a result of compression of the annular protruding part when an excessive load for inclining the cylinder body 86 with respect to the axis 70 acts.

In the illustrated embodiment, a coupling reinforcement component 90 coupled to the rear floor cross member 68 and the like at other portions (not shown) is arranged. The coupling reinforcement component 90 is supported between a bottom end of the inner sleeve 78 and a head part of the bolt 74 as a result of the insertion of a bolt 74 into a hole 92 of the coupling reinforcement component 90. An annular protruding part 82B protruding toward the coupling reinforcement component 90 is provided at a bottom end of the rubber bush 82 of the rubber bush device 76. The annular protruding part 82B is configured to suppress an excessive inclination of the cylinder body 86 and the rubber bush device 76 relative to the coupling reinforcement component 90. The coupling reinforcement component 90 may be omitted.

Referring back to FIG. 3, a differential gear device 94 is mounted to the suspension member 24. The differential gear device 94 includes support arms 96 horizontally extending on left and right side parts at a front end, and a sleeve part 98 is provided at a tip of each of the support arms 96. A rubber bush device 100 is arranged in each sleeve part 98. Each support arm 96 is coupled to the front beam 24FB of the suspension member 24 through intermediation of the rubber bush device 100 by the bolt 102. Although detailed illustration is not made in the drawings, the rubber bush device 100 has substantially the same structure as the rubber bush device 38 except that an outer sleeve has a flange part held in abutment against a top surface of the sleeve part 98. Thus, the inner sleeve is coupled to the front beam 24FB by the bolt 102 inserted into the inner sleeve, and the outer sleeve is press-fit to the sleeve part 98.

A pair of sleeve parts 104, which are arranged so as to be separated in the lateral direction of the vehicle and extend in the front-and-rear direction of the vehicle, are provided in the rear beam 24RB of the suspension member 24. A rubber bush device 106 is inserted from the rear side of the vehicle into each sleeve part 104. A rear end part of the differential gear device 94 is coupled to the rear beam 24RB through intermediation of the rubber bush devices 106 by bolts 108. Although detailed illustration is not made in the drawings, the rubber bush device 106 has substantially the same structure as the rubber bush device 38 except that an outer sleeve has a flange part held in abutment against a rear surface of the rear beam 24RB. Thus, the inner sleeve is coupled to the rear end part of the differential gear device 94 by the bolt 108 inserted into the inner sleeve, and the outer sleeve is press-fit to the sleeve part 104.

The rubber bush devices 100 and 106 are configured to suppress transmission of vibration from the differential gear device 94 to the vehicle body main part 66. In the illustrated embodiment, the rubber bush devices 100 and 106 are mounted to the suspension member 24 on the sides of the outer sleeves, but may be mounted to the suspension member 24 on the sides of the inner sleeves.

As illustrated in FIG. 2, FIG. 4, and FIG. 5, self-discharge type charge eliminators 110A and 1108 each having a strip shape are fixed to cylindrical surfaces of the sleeve part 14SA of the link 14 and the sleeve part 12SA of the wheel support component 12 by bonding so as to extend in peripheral directions. As illustrated in FIG. 2, FIG. 6, and FIG. 7, self-discharge type charge eliminators 110C and 110D each having a strip shape are fixed to cylindrical surfaces of the sleeve part 16SA of the link 16 and the socket 44Y of the ball joint 44 by bonding so as to extend in peripheral directions.

As illustrated in FIG. 2, self-discharge type charge eliminators 110E and 110F each having a strip shape are fixed to cylindrical surfaces of the sleeve part 18SA of the link 18 and the sleeve part 12SC of the wheel support component 12 by bonding so as to extend in peripheral directions. As illustrated in FIG. 2, FIG. 8, and FIG. 9, self-discharge type charge eliminators 110G and 110H each having a strip shape are fixed to cylindrical surfaces of the outer sleeve 58Y of the rubber bush device 58 and the sleeve part 12SD of the wheel support component 12 by bonding so as to extend in peripheral directions.

As illustrated in FIG. 1 and FIG. 2, self-discharge type charge eliminators 110I and 110J each having a strip shape are fixed to cylindrical surfaces of the sleeve part 22SA of the link 22 and the socket of the ball joint 64 by bonding so as to extend in peripheral directions. As illustrated in FIG. 3 and FIG. 10, self-discharge type charge eliminators 110K each having a strip shape are fixed to cylindrical surfaces of the cylinder bodies 86 of the coupling parts 24SLF, 24SLR, 24SRF, and 24SRR of the suspension member 24 by bonding so as to extend in peripheral directions.

As illustrated in FIG. 3, self-discharge type charge eliminators 110L each having a strip shape are fixed to surfaces on the vehicle front side of the front beam 24FB of the suspension member 24 by bonding so as to extend in the vehicle lateral direction at locations close to the respective rubber bush devices 100. Further, self-discharge type charge eliminators 110M each having a strip shape are fixed to surfaces on the vehicle rear side of the rear beam 24RB of the suspension member 24 by bonding so as to extend in the vehicle lateral direction at locations close to the respective rubber bush devices 106.

Figure 11:
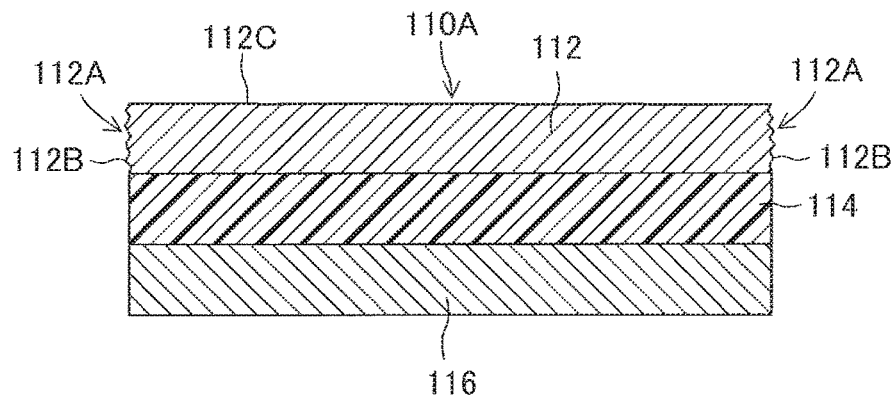
FIG. 11 is an enlarged sectional view for illustrating a self-discharge type charge eliminator before bonding.

The self-discharge type charge eliminators 110A to 110M have the same structure. Thus, with reference to FIG. 11 for illustrating a cross section of the charge eliminator 110A before the bonding, description is made only of the charge eliminator 110A. The charge eliminator 110A is formed by shearing, into predetermined size and shape, a composite sheet obtained by applying a pressure-sensitive adhesive 114 having conductivity to a metal foil 112 having conductivity, and attaching a release sheet 116 covering the pressure-sensitive adhesive 114 to the pressure-sensitive adhesive 114. The charge eliminator 110A is fixed to the member to be diselectrified by removing the release sheet 116 and bonding the metal foil 112 to the member with the pressure-sensitive adhesive 114.

As described later in detail, a side surface 112A of the metal foil 112, that is, a surface of the metal foil 112 extending in a thickness direction thereof mainly serves as a discharge surface in a diselectrification phenomenon described later. Therefore, it is preferred that the side surface 112A of the metal foil 112 have a large number of convex portions 112B such as minute protruding portions so that the diselectrification phenomenon occurs efficiently. Further, the plurality of convex portions such as the minute protruding portions may be formed on a surface 112C (upper surface of FIG. 11) of the metal foil 112 by subjecting the surface 112C to processing of increasing surface roughness.

As described later in detail, although the metal foil 112 may be made of any metal having conductivity, it is preferred that the metal foil 112 be made of aluminum, gold, silver, copper, or an alloy thereof. In particular, in the case where the charge eliminator is fixed to a metal component as in this embodiment, it is preferred that the metal foil of the charge eliminator have higher conductivity than a metal material forming the metal component. Further, it is preferred that the metal foil 112 have a thickness of from about 50 μm to about 200 μm so that the side surface 112A of the metal foil 112 have a thickness large enough to serve as the discharge surface sufficiently, and the metal foil 112 can be flexibly deformed so as to fit a curved surface to which the metal foil 112 is to be fixed.

A planar shape of the charge eliminator 110A is not limited to a strip-shaped rectangle and may be any shape other than a rectangle, such as a polygon, a circle, or an oval. It is preferred that the charge eliminator 110A have a shape that can be sheared without leaving a portion to be discarded, for example, a rectangle, a square, a rhomboid, or a hexagon. Further, the size of the charge eliminator 110A may be appropriately set in accordance with a region to which the charge eliminator 110A is applied. In the case where the charge eliminator 110A has, for example, a rectangular shape, a short side may be from about several millimeters to about more than 10 mm, and a long side may be from about several tens of millimeters to about 100 mm. Further, a structure substantially the same as the structure in which the metal foil is fixed to the surface of the metal component by the pressure-sensitive adhesive may be formed by applying a metallic coating or a carbon coating to the surface of the metal component, and applying surface treatment to the coating film.

As described above, the vehicle is electrified with the positive electric charge when the vehicle travels. Thus, not only the vehicle body main part 66 and the suspension member 24 but also the components such as the wheel support components 12, the links 14 to 22, and the rubber bush devices 38 constructing the suspensions 10 are electrified with the positive electric charge. The charge amount of the electric charge is large in the resin components than the metal components, and is small in the rubber and the oil than the metal components. In the case of the suspension 10, the charge amount in the rubber component such as the rubber bush 38Z is smaller than the charge amount in the metal wheel support component 12 or the like.

However, when the charge amounts in the link 14 and the like increase, the positive electric charge moves to the rubber bush 38Z and the like through the inner sleeve 38X, the outer sleeve 38Y, and the like, and then moves to the grease 44G and the like through the socket 44Y and the like. As a result, the charge amounts of the rubber bush 38Z, the grease 44G, and the like also increase. As a result, the elasticity of the rubber bush 38Z and the like is reduced, and the viscosity of the grease 44G and the like is increased. Thus, it is preferred that the charge amounts in the rubber bushes such as the rubber bush 38Z and the grease such as the grease 44G be decreased as a result of the decreases in the charge amounts of the metal components resulting from the diselectrification by the charge eliminator 110A and the like.

Figure 12:
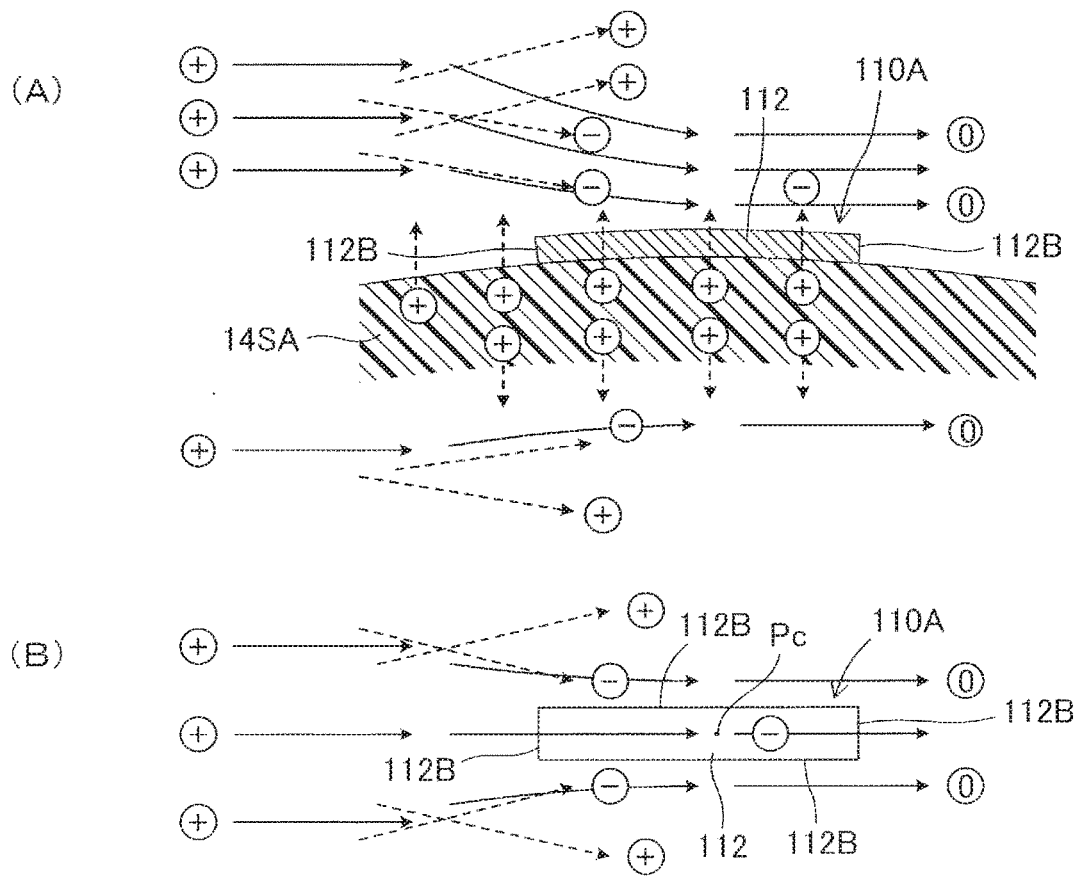

FIG. 12 are schematic explanatory views for illustrating a mechanism of diselectrification by the charge eliminator 110A, and the diselectrification by the charge eliminator 110A is assumed to be performed by the mechanism illustrated in FIG. 12. In FIG. 12, the symbols "+" and "−" denote positive and negative electric charges or ions, and the symbol "0" denotes electric charge of 0, that is, an electrically neutralized state. Further, the solid arrows denote the flow of air, and the broken arrows denote the movement of the electric charges or ions.

The air is electrified with positive electric charge. However, when the charge amount of the positive electric charge in the sleeve part 14SA of the link 14 extremely increases, the air is separated into the positive air ion and the negative air ion by so-called corona discharge around the charge eliminator 110A, particularly around the side surfaces 112A of the metal foil 112 including a large number of the protrusions 112B. The positive air ion moves so as to depart from the sleeve part 14SA by a repulsive force acting between the positive air ion and the positive electric charge with which the sleeve part 14SA is electrified. In contrast, the negative air ion is attracted by a Coulomb's force acting between the negative air ion and the positive electric charge with which the sleeve part 14SA is electrified so as to approach the sleeve part 14SA, and the positive electric charge with which the sleeve part 14SA is electrified moves so as to approach the negative air ion.

As a result, electrical neutralization is caused between the negative air ion and the positive electric charge, and the negative air ion and the positive electric charge disappear, with the result that the electric charge of air becomes 0. The above-mentioned phenomenon repeatedly occurs continuously, and hence the positive electric charge that is charged to the sleeve part 14SA is reduced to diselectrify the sleeve part 14SA. The phenomenon in which air is separated into the positive air ion and the negative air ion due to the corona discharge or the like becomes more active as the charge amount of the sleeve part 14SA is higher, and thus it is assumed that the function of diselectrification becomes more active as the charge amount is higher. Further, the diselectrification by the charge eliminator 110A is not limited to a situation in which air flows in one direction as illustrated in FIG. 12.

A bottom part of FIG. 12(A) is an illustration of a mechanism of the diselectrification in a component having a plate shape on a side opposite to the self-discharge type charge eliminator in a case where the charge eliminator is fixed to the component having the plate shape. As illustrated in the drawing, the component having the plate shape is diselectrified also on the side opposite to the charge eliminator.

According to the result of the experimental study conducted by the inventors of the present invention, in the case where the metal foil 112 (aluminum foil having a thickness of 200 μm) of the charge eliminator 110A has a rectangular shape having the above-mentioned dimensions or another shape having a similar size, the range in a surface direction in which the effect of the above-mentioned diselectrification is exerted is a range of a radius of about 50 mm from a center Pc of the metal foil 112. Further, the range in a thickness direction in which the effect of the diselectrification is exerted is a range of from about several millimeters to about more than 10 mm from the bonded surface of the metal foil 112 within the range in the surface direction in which the effect of the diselectrification is exerted. The range in which the effect of the diselectrification is exerted varies depending on the state of the charge amount of the positive electric charge or the like. Bonded surfaces of the charge eliminators 110A to 110M to the components such as the outer sleeve 38Y of the rubber bush device 38 are within ranges in which the diselectrification is exerted by the respective corresponding charge eliminators.

The positive electric charge with which the sleeve part 14SA of the link 14 is electrified is reduced as a result of the diselectrification by the charge eliminator 110A, and the electric potentials of the sleeve part 14SA and the outer sleeve 38Y of the rubber bush device 38 are reduced. Thus, the positive electric charge with which the rubber bush 38Z is electrified is reduced as a result of the movement of the positive electric charge to the outer sleeve 38Y. The positive electric charge with which the rubber bushes of the rubber bush devices 40, 42, 54, 56, 58, and 62 are electrified is also reduced as in the rubber bush 38Z.

In a case of a coated metal component such as the wheel support component 12, the coating film is also electrified with the electric charge, but the electric charge with which the coating film close to the charge eliminator is electrified moves to the charge eliminator and is reduced. Moreover, electric charge with which the metal component is electrified moves to the charge eliminator through the coating film and is reduced. Further, the electric charge with which a portion of the coating film separated from the charge eliminator is electrified once moves to the metal component, moves through the metal component, and moves from the metal component to the charge eliminator through the coating film.

Thus, according to the first embodiment, the rubber bushes of the rubber bush devices 38, 40, 42, 54, 56, 58, and 62 assembled to the coupling parts of the links 14 to 22 can be prevented from being excessively electrified with the positive electric charge. Thus, the elasticity of the rubber bushes of the rubber bush devices can be prevented from being excessively reduced as a result of the electrification by the excessive electric charge. Thus, it is possible to suppress an increase in swing resistance of the links 14 to 22 and an increase in the tendency of the transmission of the vibration and the impact between the wheels 12 and the vehicle body as a result of the reduction in the elasticity of the rubber bushes.

Moreover, according to the first embodiment, the suspension member 24 is coupled to the vehicle body main part 66 at the four coupling parts 24SLF, 24SLR, 24SRF, and 24SRR. The rubber bush device 76 is assembled to the cylinder body 86 of each coupling part, and the self-discharge type charge eliminator 110K is fixed to the surface of the cylinder body 86. Thus, the positive electric charge with which the cylinder body 86 is electrified is reduced as a result of the diselectrification by the charge eliminator 110K, and the electric potentials of the cylinder body 86 and the outer sleeve 80 of the rubber bush device 76 are thus decreased. Thus, the positive electric charge with which the rubber bush 82 is electrified is decreased as a result of the movement of the positive electric charge to the outer sleeve 80.

Thus, the rubber bushes 82 of the rubber bush devices 76 assembled to the coupling parts 24SLF, 24SLR, 24SRF, and 24SRR can be prevented from being excessively electrified with the positive electric charge. Thus, the elasticity of the rubber bushes 82 of the rubber bush devices 76 can be prevented from being excessively reduced as a result of the electrification with the excessive electric charge, thereby being capable of suppressing the increase in the tendency of the transmission of the vibration and the impact between the wheels 12 and the vehicle body.

Moreover, according to the first embodiment, the self-discharge type charge eliminator 110D is fixed to the cylindrical surface of the socket 44Y of the ball joint 44 provided at the outer end of the link 16. The self-discharge type charge eliminator 110H is fixed to the cylindrical surface of the sleeve part 12SD of the wheel support component 12 for supporting the socket 44Y of the pillow ball joint 60 provided at the outer end of the link 20. Further, the self-discharge type charge eliminator 110J is fixed to the cylindrical surface of the socket of the ball joint 64 provided at the outer end of the link 22.

Thus, the positive electric charge with which the socket 44Y of the ball joint 44 is electrified is reduced as a result of the diselectrification by the charge eliminator 110D, resulting in the reduction in positive electric charge with which the grease 44G is electrified. The positive electric charge with which the sleeve part 12SD of the wheel support component 12 and the outer sleeve component 60Y of the pillow ball joint 60 are electrified is reduced by the diselectrification by the charge eliminator 110H, resulting in the decrease in the positive electric charge with which the grease 60G is electrified. Further, the positive electric charge with which the socket of the ball joint 64 is electrified is reduced as a result of the diselectrification by the charge eliminator 110J, resulting in reduction in positive electric charge with which the grease in the ball joint 64 is electrified.

Thus, the grease 44G and the like can be prevented from being excessively electrified with the positive electric charge. Thus, the viscosity of the grease 44G and the like can be prevented from being excessively increased as a result of the electrification with excessive electric charge, thereby being capable of preventing the links 16, 20, and 22 from being less liable to swing with respect to the wheel support component 12 as a result of an increase in viscous resistance caused by the increased viscosity.

In particular, according to the first embodiment, the differential gear device 94 is mounted to the suspension member 24, and the rubber bush devices 100 and 106 are assembled to the coupling parts between the differential gear device 94 and the suspension member 24. The self-discharge type charge eliminators 110L are fixed to the surface on the vehicle front side of the front beam 24FB of the suspension member 24 close to the rubber bush devices 100. The self-discharge type charge eliminators 110M are fixed to the surface on the vehicle rear side of the rear beam 24RB of the suspension member 24 close to the rubber bush devices 106.

Thus, the positive electric charge with which the front beam 24FB is electrified is reduced as a result of the diselectrification by the charge eliminator 110L, and the positive electric charge with which the rear beam 24RB is electrified is reduced as a result of the diselectrification by the charge eliminator 110M. Thus, the positive electric charge with which the rubber bushes are electrified is reduced through the outer sleeves of the rubber bush devices 100 and 106, and the rubber bushes of the rubber bush devices 100 and 106 can thus be prevented from being excessively electrified with the positive electric charge. Thus, the elasticity of the rubber bushes of the rubber bush devices 100 and 106 can be prevented from being excessively reduced as a result of the electrification with the excessive electric charge, thereby being capable of suppressing the increase in the tendency of the transmission of the vibration between the differential gear device 94 and the vehicle body.

Second Embodiment

Figure 13:
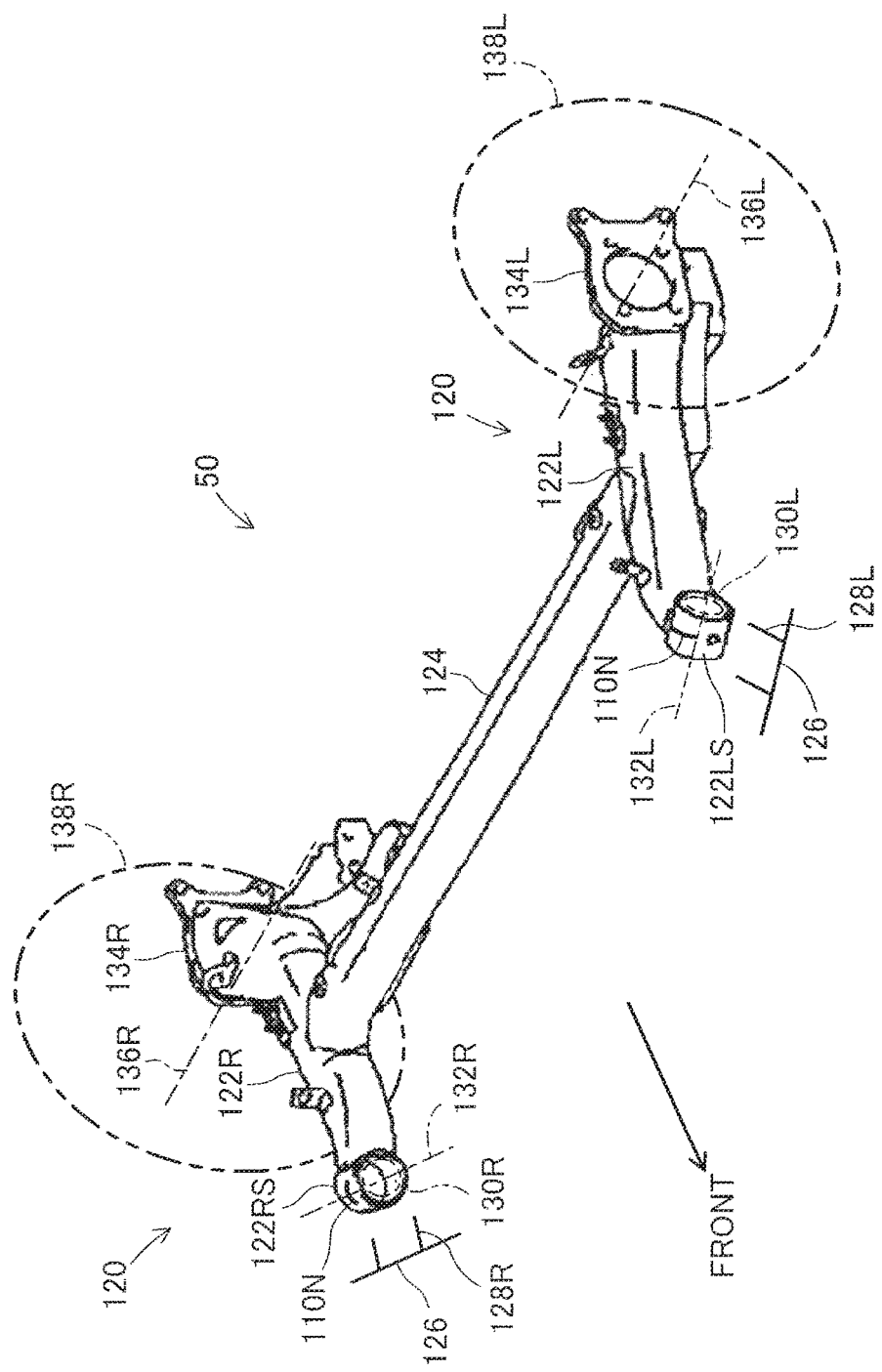
FIG. 13 is a perspective view for illustrating a suspension according to a second embodiment of the present invention applied to a torsion beam rear suspension in a partially disassembled state, as viewed obliquely from the front of the vehicle.
Figure 14:
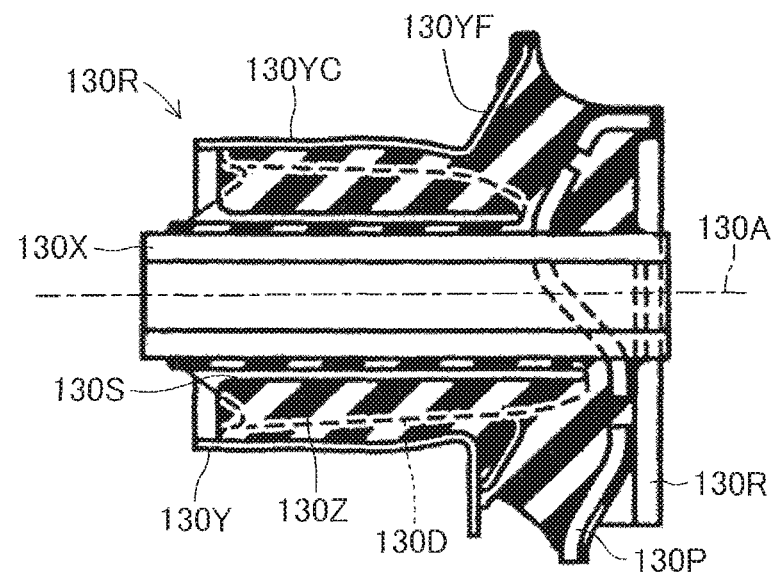
FIG. 14 is an enlarged horizontal sectional view for illustrating a bush device assembled to a trailing arm on a rear right wheel side illustrated in FIG. 13, which is taken along an axis thereof.
Figure 15:
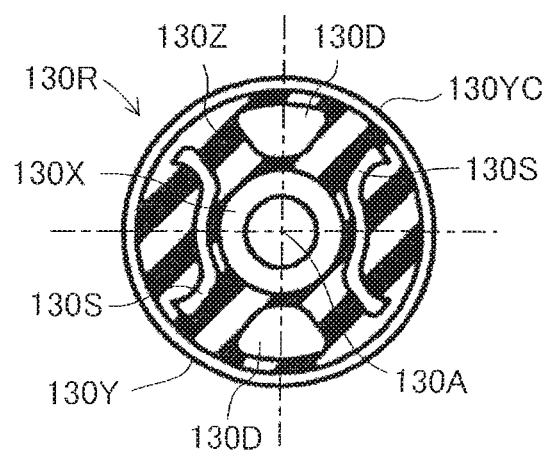
FIG. 15 is a vertical sectional view for illustrating a cylinder part of the bush device illustrated in FIG. 13, which is taken along a direction perpendicular to an axis thereof.

FIG. 13 is a perspective view for illustrating a suspension 120 according to a second embodiment of the present invention applied to a torsion beam rear suspension in a partially disassembled state, as viewed obliquely from the front of the vehicle. FIG. 14 is an enlarged horizontal sectional view for illustrating a bush device assembled to a trailing arm on a rear right wheel side illustrated in FIG. 13, which is taken along an axis thereof. FIG. 15 is a vertical sectional view for illustrating a cylinder part of the bush device illustrated in FIG. 13, which is taken along a direction perpendicular to an axis thereof.

The suspension 120 includes trailing arms 122L and 122R serving as left and right suspension components, which are separated from each other in the lateral direction of the vehicle 50 and extend in the front-and-rear direction of the vehicle, and a torsion beam 124 for integrally coupling those trailing arms to each other. As schematically illustrated in FIG. 13, front ends of the trailing arms 122L and 122R are supported by the brackets 128L and 128R, respectively, which are provided on the vehicle body 126 so as to be swingable about axes 132L and 132R through intermediation of rubber bush devices 130L and 130R.

The rubber bush devices 130L and 130R are arranged in sleeve parts 122LS and 122RS, respectively, which are provided at the front ends of the trailing arms 122L and 122R. In the illustrated embodiment, in order to secure rigidity in the lateral direction of the vehicle, the axes 132L and 132R extend obliquely with respect to the lateral direction of the vehicle and substantially horizontally so that the outer sides in the lateral direction are positioned on the rear side of the vehicle with respect to the inner sides.

Brackets 134L and 134R for mounting wheels are integrally fixed, for example, by welding, on outer surfaces of rear end parts of the trailing arms 122L and 122R. The brackets 134L and 134R extend substantially along the front-and-rear direction and the vertical direction of the vehicle. The brackets 134L and 134R are configured to support the left and right rear wheels 138L and 138R, respectively, so as to be rotatable about the rotation axes 136L and 136R through intermediation of axle hubs (not shown) and the like. The rotation axes 136L and 136R horizontally extend substantially along the lateral direction of the vehicle.

The rubber bush devices 130L and 130R have the same structure except that the rubber bush devices 130L and 130R are symmetrical about a center line (not shown) in the longitudinal direction of the vehicle. Thus, description is made of the rubber bush device 130L, and description of the rubber bush device 130R is omitted.

As illustrated in FIG. 14 and FIG. 15, the rubber bush device 130R includes an inner sleeve 130X, an outer sleeve 130Y, and a rubber bush 130Z. The inner sleeve 130X and the outer sleeve 130Y have a common axis 130A. The rubber bush 130Z is arranged between the inner sleeve 130X and the outer sleeve 130Y. Although illustration is not made, the inner sleeve 130X is mounted to a bracket 128R by a bolt inserted into the inner sleeve 130X and a nut threadedly engaged with the bolt. The outer sleeve 130Y includes a cylinder part 130YC and a flange part 130YF. The cylinder part 130YC is arranged in the sleeve part 122RS, and is fixed to the sleeve part 122RS by press-fitting.

A ring plate 130R is fixed to an inner end of the inner sleeve 130X. The ring plate 130R extends about and perpendicularly to the axis 130A. The rubber bush 130Z is also arranged between the ring plate 130R and the flange part 130YF, and a reinforcement plate 130P is embedded into the rubber bush 130Z between the ring plate 130R and the flange part 130YF. Voids 130D are provided in the rubber bush 130Z in regions located above and below the inner sleeve 130X, and slits 130S are provided in the rubber bush 130Z in regions located in the vehicle front and rear sides with respect to the inner sleeve 130X.

The ring plate 130R, the flange part 130YF, and the reinforcement plate 130P are configured to restrict swings of the trailing arms 122L and 122R in the lateral direction about the front ends when the rear wheels 138L and 138R receive lateral forces. The voids 130D and the slits 130S are configured to optimize compliance of each suspension 120 in the up-and-down direction and in the front-and-rear direction, thereby securing a good ride comfort of the vehicle.

As illustrated in FIG. 13, self-discharge type charge eliminators 110N each having a strip shape are fixed to cylindrical surfaces of the sleeve parts 122LS and 122RS provided on the front ends of the trailing arms 122L and 122R by bonding so as to extend in peripheral directions. The charge eliminator 110N has the same structure as those of the self-discharge type charge eliminators 110A to 110M of the first embodiment, and has the same function as those of the self-discharge type charge eliminators 110A to 110M.

Thus, the positive electric charge with which the sleeve parts 122LS and 122RS are electrified is reduced as a result of the diselectrification by the charge eliminators 110N, and the positive electric charge with which the outer sleeves 130Y of the rubber bush devices 130L and 130R are electrified is thus reduced. Thus, the positive electric charge with which the rubber bushes 130Z of the rubber bush devices 130L and 130R are electrified is reduced, and the rubber bushes 130Z can thus be prevented from being excessively electrified with the positive electric charge. Thus, it is possible to suppress an increase in swing resistance in the up-and-down direction of the trailing arms 122L and 122R and the increase in the tendency of the transmission of the vibration and the impact between the rear wheels 138L and 138R and the vehicle body 126 caused by the reduction in elasticity of the rubber bushes 130Z.

According to the second embodiment, the ring plate 130R, the flange part 130YF, and the reinforcement plate 130P are provided. Thus, even when the elasticity of the rubber bushes 130Z of the rubber bush devices 130L and 130R is increased as a result of the diselectrification by the charge eliminators 110N, the restriction effect on the swings of the trailing arms 122L and 122R in the lateral direction about the front ends is not excessively reduced.

Third Embodiment

Figure 16:
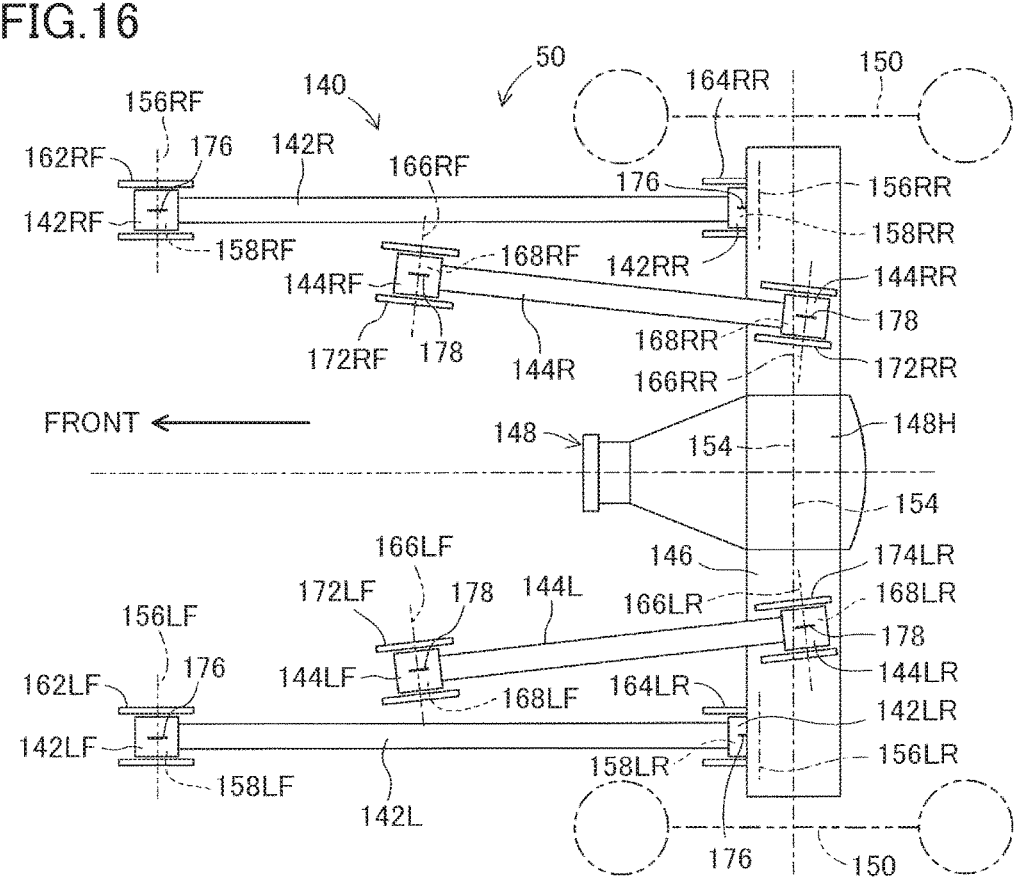
FIG. 16 is a plan view for illustrating a suspension according to a third embodiment of the present invention applied to a four-link axle rear suspension.
Figure 17:
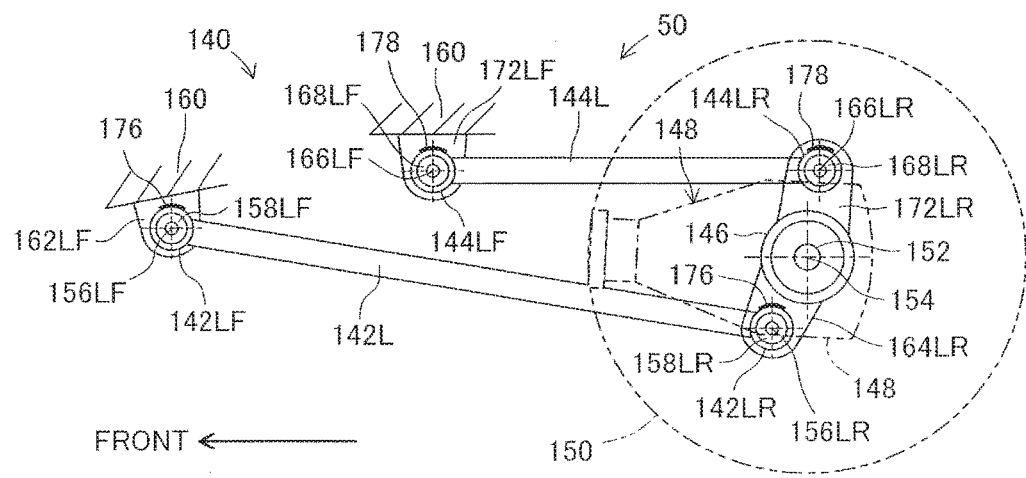
FIG. 17 is a side view for illustrating the suspension according to the third embodiment of the present invention applied to the four-link axle rear suspension.

FIG. 16 and FIG. 17 are a plan view and a side view for illustrating a suspension 140 according to a third embodiment of the present invention applied to a four-link axle rear suspension.

In those drawings, the suspension 140 includes four control links 142L, 142R, 144L, and 144R, which are suspension components, and an axle housing 146 extending in the lateral direction of the vehicle 50. A housing 148H of a differential device 148 is integrally formed in a center part of the axle housing 146, but the housing 148H may be independent of the axle housing 146.

The axle housing 146 is configured to support an axle 152 coupled to the wheels (rear wheels) 150 at both ends so as to be rotatable about a rotation axis 154 through intermediation of bearings (not shown). Thus, the axle housing 146 and the bearings function as wheel support components. Although illustration is not made in FIG. 16 and FIG. 17, compression coil springs serving as suspension springs and shock absorbers are arranged between both end parts of the axle housing 146 and a vehicle body 160 located above the axle housing 146.

The control links 142L and 142R extend in the front-and-rear direction of the vehicle in parallel with each other at positions lower than the axle housing 146, and function as a pair of lower control links (main control links). The control links 144L and 144R extend substantially in the front-and-rear direction of the vehicle at positions higher than the axle housing 146, and function as a pair of upper control links (sub control links). An interval between the front ends of the control links 144L and 144R is set to be larger than the interval between the rear ends, but the interval between the front ends may be set to be smaller than the interval between the rear ends.

The left and right control links 142L and 142R have the same configuration, and the left and right control links 144L and 144R have the same configuration. Thus, description is made of the control links 142L and 144L on the left side, and description of the control links 142R and 144R on the right side is omitted. In FIG. 16 and FIG. 17, components relating to the control links 142R and 144R on the right side are denoted by reference symbols which are acquired by replacing "L" of the reference symbols assigned to the components relating to the control links 142L and 144L on the left side with "R".

Sleeve parts 142LF and 142LR are provided at the front end and the rear end of the control link 142L, respectively, and the sleeve parts 142LF and 142LR include axes 156LF and 156LR, respectively, which extend in the lateral direction of the vehicle. Rubber bush devices 158LF and 158LR are arranged in the sleeve parts 142LF and 142LR, respectively.

The front end of the control link 142L is coupled to a bracket 162LF mounted to the vehicle body 160 through intermediation of the rubber bush device 158LF, and is supported by the rubber bush device 158LF and the bracket 162LF so as to be swingable about the axis 156LF. The rear end of the control link 142L is coupled to a bracket 164LR mounted to a bottom surface of the axle housing 146 through intermediation of the rubber bush device 158LR, and is supported by the rubber bush device 158LR and the bracket 164LR so as to be swingable about the axis 156LR.

Sleeve parts 144LF and 144LR are provided at the front end and the rear end of the control link 144L, respectively, and the sleeve parts 144LF and 144LR include axes 166LF and 166LR, respectively, which extend in the lateral direction of the vehicle. Rubber bush devices 168LF and 168LR are arranged in the sleeve parts 144LF and 144LR, respectively.

The front end of the control link 144L is coupled to a bracket 172LF mounted to the vehicle body 160 through intermediation of the rubber bush device 168LF, and is supported by the rubber bush device 168LF and the bracket 172LF so as to be swingable about the axis 166LF. The rear end of the control link 144L is coupled to a bracket 174LR mounted to a top surface of the axle housing 146 through intermediation of the rubber bush device 168LR, and is supported by the rubber bush device 168LR and the bracket 174LR so as to be swingable about the axis 166LR.

Although detailed illustration is not made in FIG. 16 and FIG. 17, the rubber bush devices such as the rubber bush device 158LF have the structures substantially the same as that of the rubber bush device 38 of the first embodiment. In other words, each rubber bush device includes an inner sleeve, an outer sleeve, and a rubber bush arranged between the inner sleeve and the outer sleeve. The inner sleeve of each rubber bush device is mounted to the bracket 162LF or the like by a bolt, a nut, and the like, and the outer sleeve is mounted to the sleeve part 142LF or the like by press-fitting. The inner sleeve and the outer sleeve may be mounted to a yoke provided on an end part of the control link and a bracket provided on the vehicle body, respectively.

When the wheel 150 bounds and rebounds, the axle housing 146 moves upward and downward. Thus, the control links 142L and 142R are configured to swing about the axes 156LF and 156RF, respectively, with respect to the vehicle body 160, and swing about the axes 156LR and 156RR, respectively, with respect to the axle housing 146 through elastic deformations of the rubber bushes of the rubber bush device 158LF and the like. Similarly, the control links 144L and 144R are configured to swing about the axes 166LF and 166RF, respectively, with respect to the vehicle body 160, and swing about the axes 166LR and 166RR, respectively, with respect to the axle housing 146 through elastic deformations of the rubber bushes of the rubber bush device 168LF and the like.

As illustrated in FIG. 16 and FIG. 17, self-discharge type charge eliminators 176 each having a strip shape are fixed to cylindrical surfaces of the sleeve parts 142LF, 142LR, 142RF, and 142RR on the both ends of the control links 142L and 142R by bonding so as to extend in peripheral directions. Similarly, self-discharge type charge eliminators 178 each having a strip shape are fixed to cylindrical surfaces of the sleeve parts 144LF, 144LR, 144RF, and 144RR on the both ends of the control links 144L and 144R by bonding so as to extend in peripheral directions. The charge eliminators 176 and 178 have the same structures as those of the self-discharge type charge eliminators 110A to 110M of the first embodiment, and have the same function as those of the self-discharge type charge eliminators 110A to 110M.

Thus, the positive electric charge with which the sleeve parts 142LF, 142LR, 142RF, and 142RR are electrified is reduced as a result of the diselectrification by the charge eliminators 176, and the positive electric charge with which the rubber bushes of the rubber bush devices 158LF, 158LR, 158RF, and 158RR are electrified is reduced through the outer sleeves. Similarly, the positive electric charge with which the sleeve parts 144LF, 144LR, 144RF, and 144RR are electrified is reduced as a result of the diselectrification by the charge eliminators 178, and the positive electric charge with which the rubber bushes of the rubber bush devices 168LF, 168LR, 168RF, and 168RR are electrified is reduced through the outer sleeves.

Thus, the rubber bushes of the respective rubber bush devices can be prevented from being excessively electrified with the positive electric charge. Thus, it is possible to suppress an increase in swing resistance of the control links 142L, 142R, 144L, and 144R as a result of the reduction in elasticity of the rubber bushes and an increase in the tendency of the transmission of the vibration and the impact between the wheels 150 and the vehicle body 160.

According to the present invention, it can be understood from the third embodiment that, even when the suspension arm serving as the suspension component is not coupled to the suspension member, but is directly coupled to the vehicle body main part, rubber bushes of coupling parts can be prevented from being excessively electrified with the positive electric charge.

Fourth Embodiment

Figure 18:
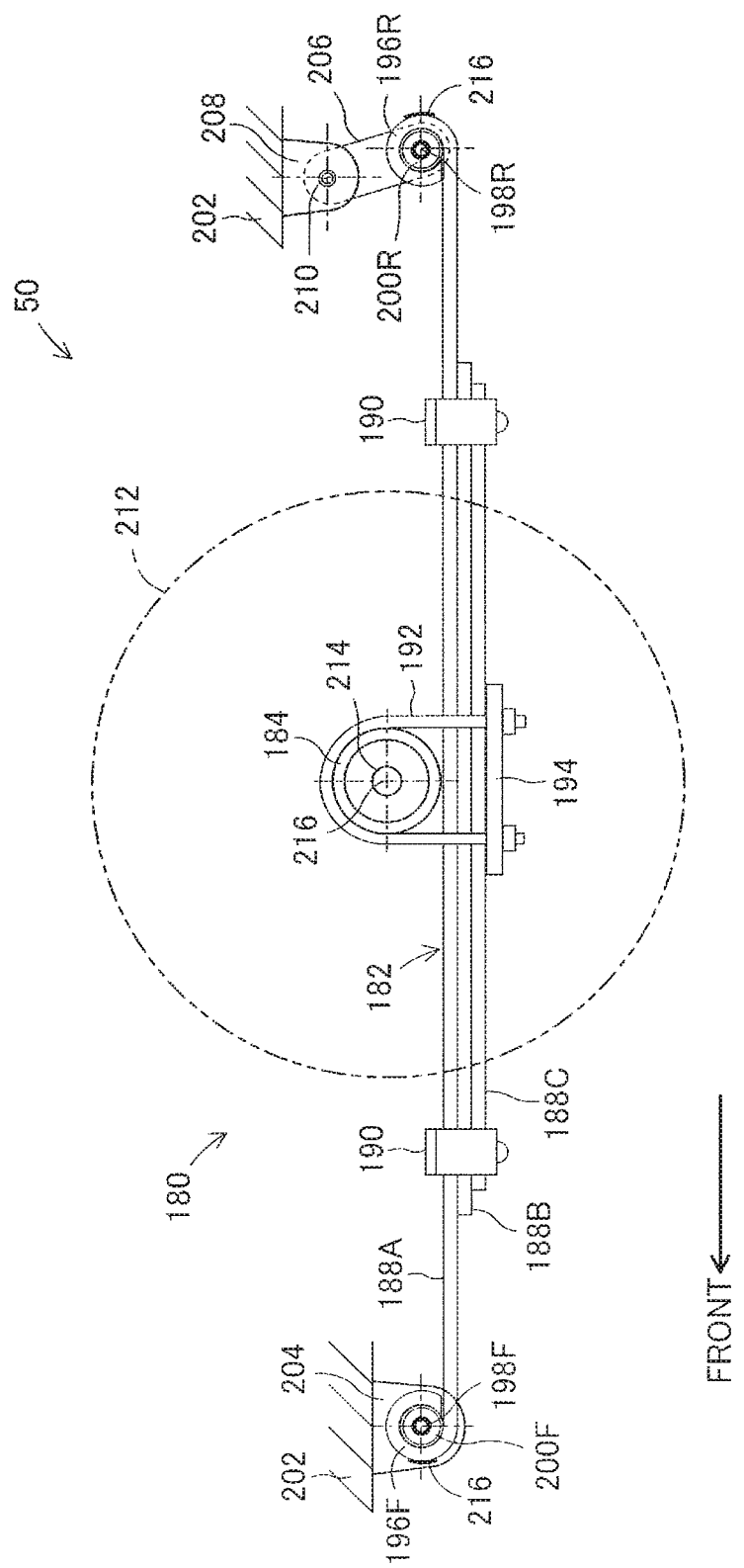
FIG. 18 is a side view for illustrating a suspension according to a fourth embodiment of the present invention applied to a leaf-spring axle rear suspension.

FIG. 18 is a side view for illustrating a suspension 180 according to a fourth embodiment of the present invention applied to a leaf-spring axle rear suspension.

In FIG. 18, the suspension 180 includes a pair of leaf springs 182, which also function as suspension components, and an axle housing 184 extending in the lateral direction of the vehicle 50. The pair of leaf springs 182 are separated from each other in the lateral direction of the vehicle 50, and extend in parallel with each other in the front-and-rear direction of the vehicle. Although illustration is not made in FIG. 18, as in the third embodiment, a housing of a differential device is integrally formed in a center part of the axle housing 184 in the lateral direction of the vehicle 50. The housing of the differential device may be independent of the axle housing 184.

The leaf spring 182 includes three spring leaves 188A to 188C having long plate shapes which are different from one another in length. Those spring leaves are illustrated in FIG. 18 so as to linearly extend, but curve downward in protruded shapes. The lengths of the spring leaves 188A to 188C decrease in this order, and are held in a stacked state by leaf clips 190. In the illustrated embodiment, the leaf springs 182 are located below both end parts of the axle housing 184, respectively, and are mounted to the axle housing 184 by U bolts 192 and support plates 194.

The longest spring leaf 188A among the three spring leaves functions as a main spring leaf. Mounting eyes 196F and 196R are integrally formed at a front end and a rear end of the spring leaf 188A, and the mounting eyes 196F and 196R have axes 198F and 198R, respectively, which extend in the lateral direction of the vehicle. Rubber bush devices 200F and 200R are arranged in the mounting eyes 196F and 196R, respectively.

The front end of the spring leaf 188A is coupled to a bracket 204 mounted to a vehicle body 202 through intermediation of the rubber bush device 200F, and is supported by the rubber bush device 200F and the bracket 204 so as to be swingable about the axis 198F. The rear end of the spring leaf 188A is coupled to a bottom end of a shackle 206 through intermediation of the rubber bush device 200R, and is supported by the rubber bush device 200R and the shackle 206 so as to be swingable about the axis 198R. A top end of the shackle 206 is supported by a bracket 208 mounted to the vehicle body 202 so as to be swingable about an axis 210 extending in the lateral direction of the vehicle.

The axle housing 184 is configured to support an axle 214 coupled to the wheels (rear wheels) 212 at both ends so as to be rotatable about a rotation axis 216 through intermediation of bearings (not shown). Thus, the leaf springs 182, the axle housing 184, and the bearings function as wheel support components. Although illustration is not made in FIG. 18, compression coil springs serving as suspension springs and shock absorbers are arranged between both end parts of the axle housing 184 and the vehicle body 202 located above the axle housing 184.

Although illustration is not made in FIG. 18, the rubber bush devices 200F and 200R have the structures substantially the same as that of the rubber bush device 38 of the first embodiment. In other words, each rubber bush device includes an inner sleeve, an outer sleeve, and a rubber bush arranged between the inner sleeve and the outer sleeve. The inner sleeves of the rubber bush devices 200F and 200R are mounted to the bracket 204 and the shackle 206, respectively, by bolts and nuts, and the outer sleeves are mounted to the mounting eyes 196F and 196R, respectively, by press-fitting.

When wheels 212 bound and rebound, the axle housing 184 moves upward and downward, and the leaf springs 182 elastically deform while supporting the axle housing 184. Thus, the leaf spring 182 functions as a suspension component coupled to the vehicle body 202 and the wheel support component and also functions as a suspension spring.

A front end part of the leaf spring 182 is configured to swing about the axis 198F with respect to the vehicle body 200 through the elastic deformation of the rubber bush of the rubber bush device 200F. A rear end part of the leaf spring 182 is configured to swing about the axis 198R with respect to the shackle 206 through the elastic deformation of the rubber bush of the rubber bush device 200R. A change in distance between the mounting eyes 196F and 196R caused by the elastic deformation of the leaf spring 182 is absorbed by the swing of the shackle 206 about the axis 210.

As illustrated in FIG. 18, the mounting eyes 196F and 196R at the front end and the rear end of the leaf spring 182 include surfaces having cylinder shapes, and self-discharge type charge eliminators 216 each having a strip shape are fixed to the cylindrical surfaces by bonding so as to extend in peripheral directions. The charge eliminator 216 has the same structure as those of the self-discharge type charge eliminators 110A to 110M of the first embodiment, and has the same function as those of the self-discharge type charge eliminators 110A to 110M.

Thus, the positive electric charge with which the mounting eyes 196F and 196R are electrified is reduced as a result of the diselectrification by the charge eliminators 216, and the positive electric charge with which the rubber bushes of the rubber bush devices 200F and 200R are electrified is reduced through the outer sleeves. Thus, the rubber bushes of the rubber bush devices 200F and 200R can be prevented from being excessively electrified with the positive electric charge. Thus, it is possible to suppress an increase in swing resistance of the leaf springs 182 as a result of the reduction in elasticity of the rubber bushes and an increase in the tendency of the transmission of the vibration and the impact between the wheels 212 and the vehicle body 202.

Fifth Embodiment

Figure 19:
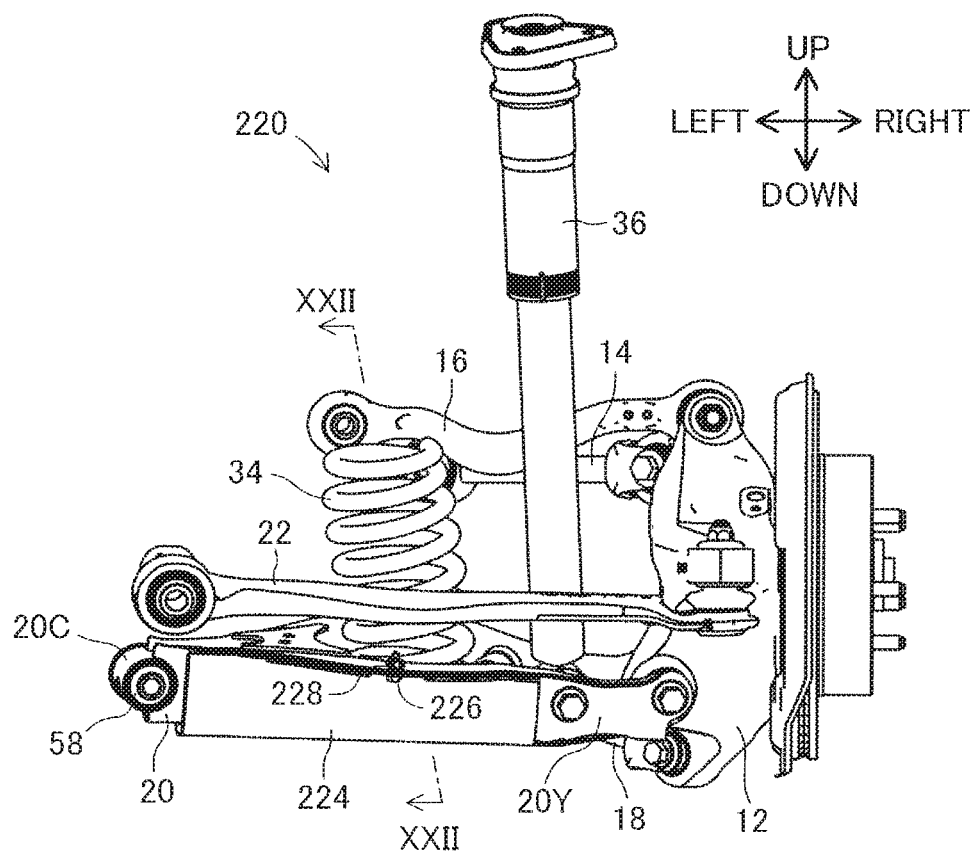
FIG. 19 is a rear view for illustrating a suspension for a rear right wheel according to a fifth embodiment of the present invention applied to a multi-link rear suspension.
Figure 20:
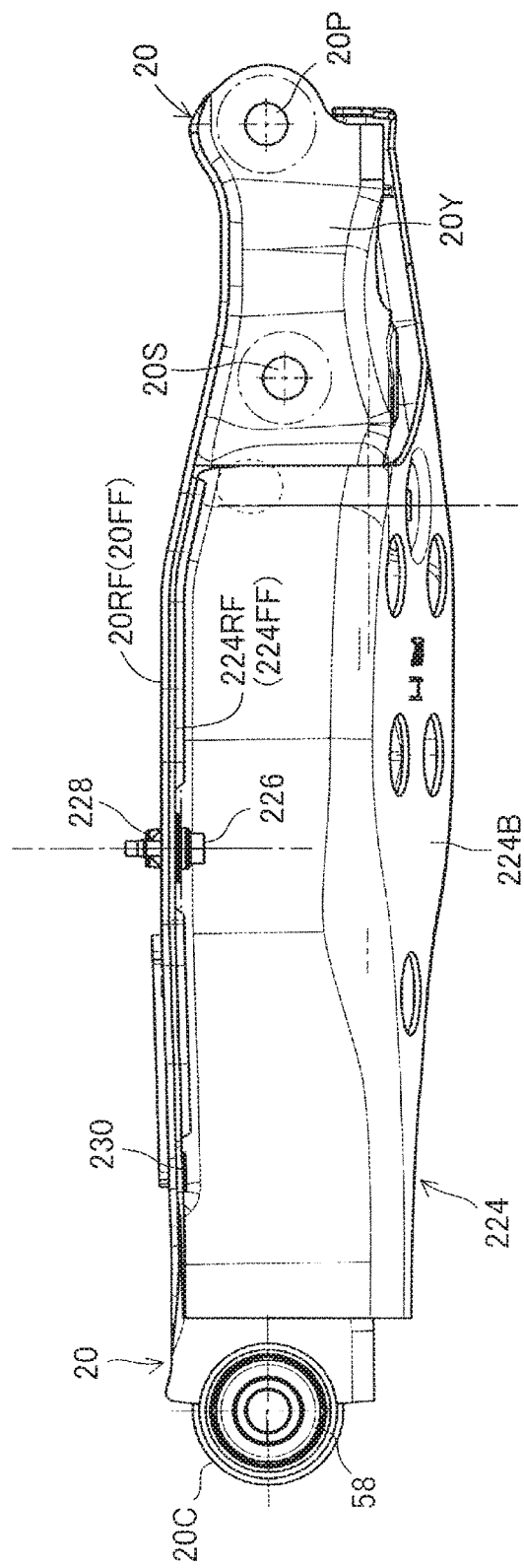
FIG. 20 is a rear view for illustrating, in an enlarged manner, a lower arm on a rear side of the vehicle illustrated in FIG. 19.
Figure 21:
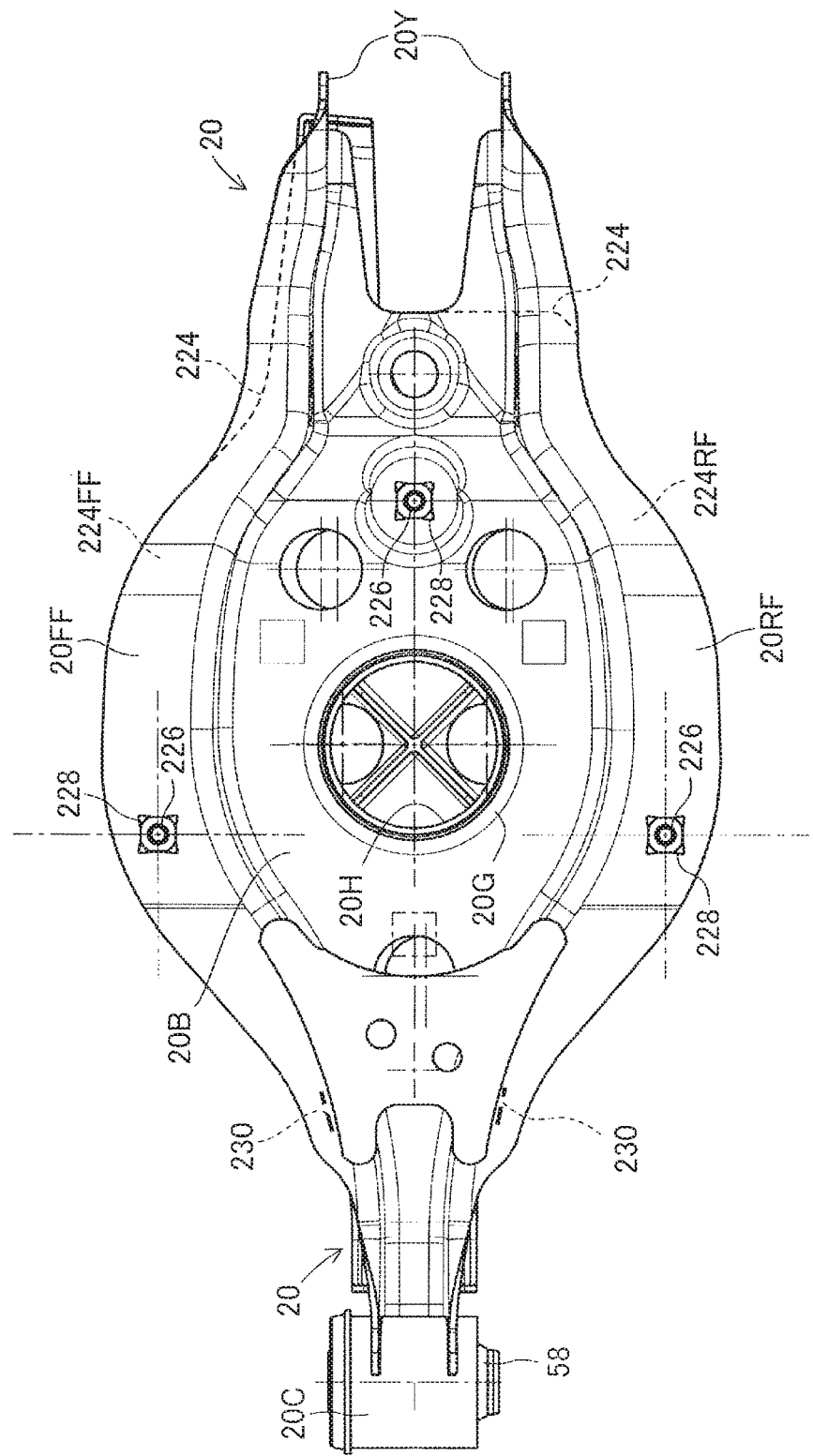
FIG. 21 is a plan view for illustrating, in an enlarged manner, the lower arm on the rear side of the vehicle illustrated in FIG. 19.
Figure 22:
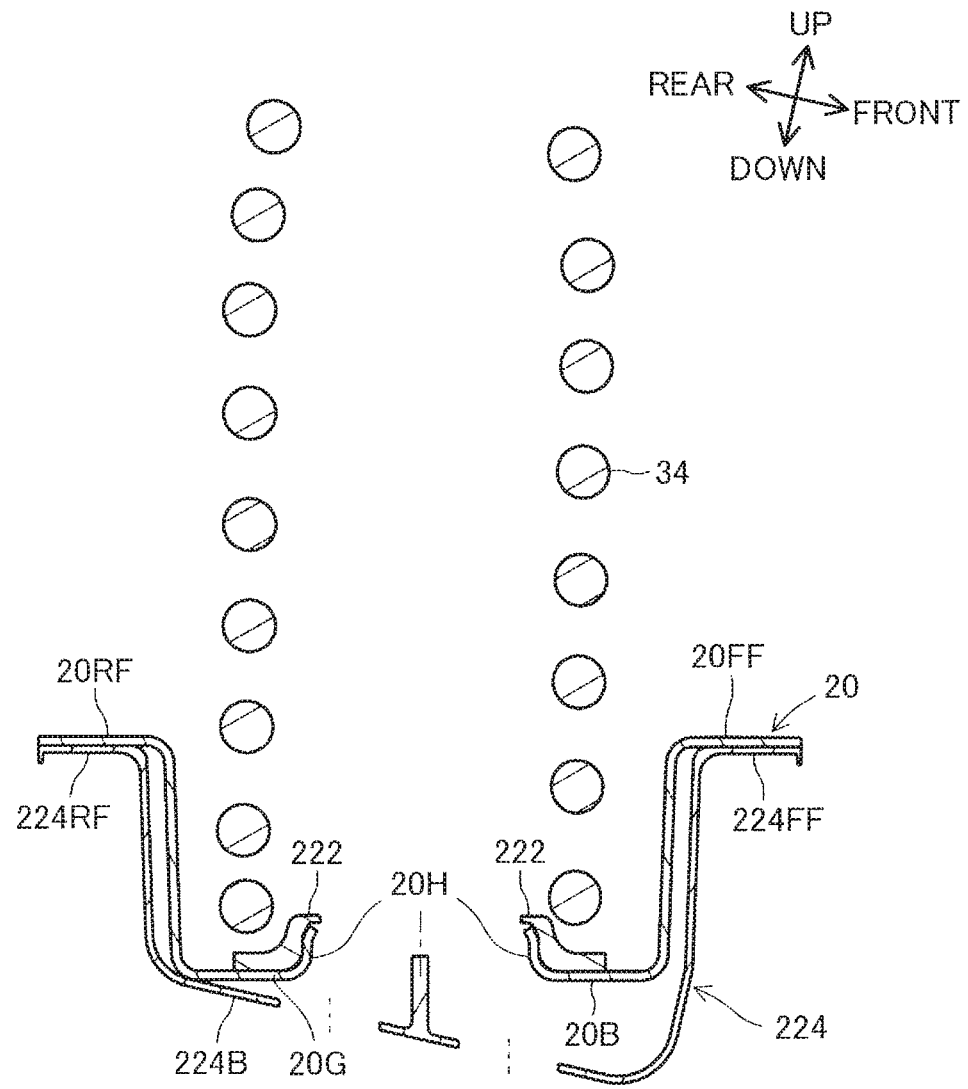
FIG. 22 is an enlarged sectional view which is taken along the line XXII-XXII of FIG. 19.

FIG. 19 is a rear view for illustrating a suspension 220 for a rear right wheel according to a fifth embodiment of the present invention applied to a multi-link rear suspension. FIG. 20 and FIG. 21 are a rear view and a plan view for illustrating, in an enlarged manner, a lower arm on a rear side of the vehicle illustrated in FIG. 19. FIG. 22 is an enlarged sectional view which is taken along the line XXII-XXII of FIG. 19. In FIG. 19 to FIG. 21, the same reference symbols assigned in FIG. 1 and FIG. 2 are assigned to components corresponding to the components illustrated in FIG. 1 and FIG. 2.

In those drawings, the suspension 220 includes the wheel support component (knuckle) 12 and the five links 14 to 22 as in the suspension 10 according to the first embodiment. The links 14 to 22 are coupled to the wheel support component 12 at the outer ends, and are coupled to the suspension member (not shown) at the inner ends as in the first embodiment. The toe control link 22 is arranged on the rear side of the vehicle with respect to the wheel support component 12. The bottom end of the shock absorber 36 is coupled to a vicinity of the outer end of the link 20, namely the lower arm 20 on the vehicle rear side, and the compression coil spring 34 is arranged inside the vehicle with respect to the shock absorber 36 independently of the shock absorber 36.

The outer end of the lower arm 20 forms a yoke 20Y for supporting a pillow ball joint which is the same as the pillow ball joint 60 of the first embodiment, and a cylinder body 20C which is the same as the cylinder part 20A of the first embodiment is fixed to the inner end of the lower arm 20 by welding or the like. A rubber bush device 58 is arranged in a cylinder body 20C. In FIG. 20, the reference symbols 20P and 20S indicate bolt holes for supporting the pillow ball joint and the bottom end of the shock absorber 36, respectively. In FIG. 21 and FIG. 22, the reference symbol 20H denotes a hole formed at the center of a bottom wall part 20B of the lower arm 20, and a region 20G around the hole 20H is a seat part for supporting the bottom end of the compression coil spring 34 through intermediation of a spring seat component 222.

As illustrated in FIG. 22, the lower arm 20 has a substantially staple-shaped cross section which is opened upward, and has flange parts 20FF and 20RF at edge parts on both sides. An arm cover 224 made of resin is arranged below the lower arm 20. The arm cover 224 also has a substantially staple-shaped cross section which is opened upward, and has flange parts 224FF and 224RF at edge parts on both sides. The flange parts 224FF and 224RF are held in abutment against the flange parts 20FF and 20RF, respectively, and a part of the bottom wall part 224B is held in abutment against the bottom wall part 20B of the lower arm 20. The arm cover 224 is integrally mounted to the lower arm 20 by bolts 226 and nuts 228 arranged at abutment parts against the lower arm 20 at three locations, and is separated from the lower arm 20 in regions other than abutment parts including the abutment parts at the three locations.

As illustrated in FIG. 20 and FIG. 21, self-discharge type charge eliminators 230 each having a strip shape are fixed to bottom surfaces of the flange parts 224FF and 224RF of an inner end part of the arm cover 224 by bonding so as to extend substantially in a longitudinal direction. The charge eliminator 230 has the same structure as those of the self-discharge type charge eliminators 110A to 110M of the first embodiment, and has the same function as those of the self-discharge type charge eliminators 110A to 110M. The self-discharge type charge eliminator 110G is not fixed to a surface of the cylinder body 20C, but the self-discharge type charge eliminator 110G may be fixed by bonding so as to extend in a peripheral direction. Although illustration is not made, the self-discharge type charge eliminators 110A and the like are fixed to the sleeve part 14SA and the like of the both end parts of the other links 14 to 18 and 22 by bonding as in the first embodiment.

Thus, the positive electric charge with which the flange parts 224FF and 224RF are electrified is reduced as a result of the diselectrification by the charge eliminators 230, and the positive electric charge with which the lower arm 20 is electrified is thus reduced through the flange parts 20FF and 20RF held in abutment against the flange parts 224FF and 224RF. Thus, the positive electric charge with which the rubber bush is electrified is reduced through the cylinder body 20C and the outer sleeve of the rubber bush device 58. The positive electric charge with which the rubber bushes of the rubber bush devices arranged in the sleeve part 14SA and the like on the both end parts of the other links 14 to 18 and 22 are electrified is reduced as in the case of the first embodiment.

Thus, according to the fifth embodiment, the rubber bushes of the respective rubber bush devices can be prevented from being excessively electrified with the positive electric charge as in the case of the first embodiment. Thus, it is possible to suppress an increase in swing resistance of the links 14 to 22 as a result of the reduction in elasticity of the rubber bushes and an increase in the tendency of the transmission of the vibration and the impact between the wheels and the vehicle body, which is not illustrated.

In particular, according to the fifth embodiment, the self-discharge type charge eliminators 230 are fixed to the flange parts 224FF and 224RF of the arm cover 224 made of the resin, which is liable to be electrified with the positive electric charge more than metal. Thus, the charge eliminator 230 exhibits the diselectrification action higher in performance than the charge eliminators fixed to the lower arm 20, which is a metal component, thereby effectively diselectrifying the cylinder body 20C, which is a part of the lower arm 20. Thus, the positive electric charge with which the rubber bush of the rubber bush device 58 is electrified can effectively be decreased as compared with the case where the self-discharge type charge eliminator is fixed to the cylinder body 20C.

The following effects were able to be confirmed by the inventors of the present invention carrying out an experiment for the suspensions according to the first to the fifth embodiments. In other words, in a case where the self-discharge type charge eliminators 110A to 110M and the like are not provided, the electric potentials of the rubber bushes of the rubber bush devices, the grease in the ball joints, and the grease in the pillow balls increased to about several hundreds to about several thousands of volts. In contrast, with the configurations according to the first to the fifth embodiments, the electric potentials of the rubber bushes of the rubber bush devices, the grease in the ball joints, and the grease in the pillow balls increased only to about several tens of volts, and appropriate elasticity of the rubber buses and appropriate viscosity of the grease were able to be secured.

As is understood from the description above, according to the above-mentioned respective embodiments, the diselectrification is performed by the self-discharge type charge eliminators for the rubber bush devices, the ball joints, and the pillow balls, which are the joints for coupling the suspension components, and the vehicle body and the wheel support components to each other. Thus, the rubber bushes of the rubber bush devices, the grease in the ball joints, and the grease in the pillow balls are diselectrified, and the reduction in elasticity of the rubber bushes and the increase in viscosity of the grease can thus be suppressed. Thus, the increase in swing resistance of the suspension components and the increase in the tendency of the transmission of the vibration and the impact between the wheels and the vehicle body can be suppressed.

Moreover, the charge eliminators 110A to 110M and the like in the respective embodiments are the so-called ion-separation, non-grounded, self-discharge type charge eliminators. In other words, the charge eliminator 110A and the like separate the air into positive air ions and negative air ions through corona discharge, and perform the diselectrification through electrical neutralization between the positive electric charge that is charged to the components of the suspension and the negative air ions, thereby requiring no wires for electrical grounding. Thus, as compared with the case where the static electricity eliminator disclosed in Patent Literature described above is used, the structure for the diselectrification in the suspension can be simplified, and a cost required for attaining the diselectrification can be significantly reduced.

In particular, according to the first to fifth embodiments, the diselectrification is performed for the sleeve parts and the like by the self-discharge type charge eliminator, and the positive electric charge with which the rubber bushes of the rubber bush devices are electrified is moved to the sleeve parts and the like through the outer sleeves, and is thus reduced. A contact area of the outer sleeve with the rubber bush is larger than a contact area of the inner sleeve with the rubber bush. Thus, the positive electric charge with which the rubber bush is electrified can effectively be reduced as compared with a case of a configuration in which the positive electric charge with which the rubber bush is electrified is moved to other components through the inner sleeve as a result of the diselectrification by the self-discharge type charge eliminator.

Moreover, according to the first to the fifth embodiments, the diselectrification is performed in the coupling parts on the both ends of the suspension components such as the link 14 by the charge eliminators 110A and the like, and the positive electric charge with which the coupling parts are electrified is reduced. Thus, as compared with a case where the diselectrification is performed for the coupling part only on one end of the suspension component, the coupling parts on the both ends of the suspension component can effectively be prevented from being excessively electrified with the positive electric charge, thereby being capable of causing the suspension component to smoothly swing.

Moreover, according to the first to fifth embodiments, also in the case where the self-discharge type charge eliminators are installed on the sleeve part and the like of the suspension arm, the charge eliminators are directly fixed to those components by bonding. Thus, a specific component for fixing the charge eliminator does not need to be added, and the charge amounts of the electric charge of the rubber bush of the rubber bush device, the grease in the ball joint, and the grease in the pillow ball can be decreased without causing increases in complexity of the structure of the suspension and the cost.

Further, according to the first to fifth embodiments, each of the charge eliminator 110A and the like is in the form of the tape obtained by applying the pressure-sensitive adhesive 114 having conductivity to the metal foil 112 having conductivity, and the charge eliminator is fixed to the member to be diselectrified by the bonding of the metal foil 112 to the member with the pressure-sensitive adhesive 114. Thus, the metal foil for the diselectrification can easily be fixed by the bonding to the surface of the member to be diselectrified. Further, a layer of the pressure-sensitive adhesive has the conductivity, and hence, as compared with the case where the layer of the pressure-sensitive adhesive does not have the conductivity, the electric charge can efficiently be moved from the specific component to the metal foil, thereby being capable of enhancing the effect of the diselectrification. As long as the thickness of the layer of the pressure-sensitive adhesive is about several tens of micrometers to about several hundreds of micrometers, even when the layer of the pressure-sensitive adhesive does not have the conductivity, the electric charge can be moved from the specific component to the metal foil. Thus, the layer of the pressure-sensitive adhesive need not have the conductivity.

The specific embodiments of the present invention are described in detail above. However, the present invention is not limited to the above-mentioned embodiments. It is apparent for those skilled in the art that various other embodiments may be employed within the scope of the present invention.

For example, according to the above-mentioned respective embodiments, the self-discharge type charge eliminator 110A or the like is fixed to the outer surface of the sleeve part for storing the rubber bush device, and the positive electric charge with which the rubber bush of the rubber bush device is electrified is moved to the sleeve part and the like through the outer sleeve, and is thus reduced. However, the positive electric charge with which the rubber bush is electrified may be reduced by fixing the self-discharge type charge eliminator to a component connected to the inner sleeve of the rubber bush device, and moving the positive electric charge with which the rubber bush is electrified to other components through the inner sleeve. Further, the positive electric charge with which the rubber bush is electrified may be reduced by moving the positive electric charge to the sleeve part and the like through both the inner sleeve and the outer sleeve.

The fixed position, the number, and the extension direction of the charge eliminator are not limited to the position, the number, and the extension direction of the above-mentioned respective embodiments. For example, the charge eliminator 110A and the like may be fixed to the outer sleeve or the inner sleeve of the rubber bush device, or may further be fixed to the rubber bush itself. Moreover, the charge eliminator fixed so as to extend in the peripheral direction in the respective embodiments may be fixed so as to extend, for example, along the axial direction.

Moreover, in the above-mentioned respective embodiments, in the suspension arm such as the link 14 coupled to the wheel support component 12 and the vehicle body, the positive electric charge with which the joint devices such as the rubber bush devices on both ends of the suspension arm are electrified is reduced. However, the respective embodiments may be modified so that the positive electric charge with which the joint device such as the rubber bush device on one of the inner end and the outer end of the suspension arm is electrified is reduced.

Moreover, in the above-mentioned respective embodiments, the bush device is the rubber bush device, and the rubber-like elastic component built into the bush device is rubber. However, the rubber-like elastic component may be, for example, resin or the like as long as the rubber-like elastic component can permit the swing of the suspension arm and the like, thereby suppressing the transmission of the vibration and impact.

Moreover, in the above-mentioned first to the fifth embodiments, the self-discharge type charge eliminators 110D and the 110J are fixed to the ball joints 44 and 64, respectively, on the outer ends of the links 16 and 22, but the charge eliminators for the diselectrification for the ball joints may be omitted. Similarly, the self-discharge type charge eliminator 110H is fixed to the outer end of the link 20 for supporting the pillow ball joint 60, but the charge eliminator for the diselectrification for the pillow ball joint may be omitted.

Moreover, in the above-mentioned first to fifth embodiments, the rubber bush devices 42 and 62 are provided for the inner ends of the links 16 and 22, respectively, and the ball joints 44 and 64 are provided for the outer ends of the links 16 and 22, respectively. Moreover, the rubber bush device 58 is provided at the inner end of the link 20, and the pillow ball joint 60 is provided at the outer end. However, a ball joint or a pillow ball joint may be provided at the inner end of the suspension arm, and a rubber bush device may be provided at the outer end. Then, also in this case, the self-discharge type charge eliminator may be fixed to each of the inner end and the outer end of the suspension arm.

Moreover, in the above-mentioned first to fifth embodiments, the suspension arms 14 to 22 serving as the suspension components are the links each having the I shape, but the suspension arms may have an A shape, an inversed A shape, an L shape, or the like. Moreover, the suspensions in the above-mentioned first to fifth embodiments are multi-link suspensions. The independent suspension including the suspension arm extending in the direction crossing in the front-and-rear direction of the vehicle as the suspensions in the above-mentioned first to the fifth embodiments may be a suspension of other type such as the MacPherson strut front suspension or the double wishbone suspension.

Moreover, according to the above-mentioned second embodiment, the torsion beam 124 is coupled to middle points each between the front end and the rear end of each of the trailing arms 112L and 122R, but the torsion beam may be coupled to the front ends or the rear ends of the trailing arms. Moreover, the suspension in the above-mentioned second embodiment is the suspension of the torsion beam type in which the trailing arms 122L and 122R are coupled to each other by the torsion beam 124. The suspension according to the present invention may be applied to an independent trailing arm suspension in which the left and right trailing arms can swing independently of each other.

Moreover, in the above-mentioned respective embodiments, the suspensions are rear suspensions, and the wheels are non-steered wheels, but the suspension according to the present invention may be a front suspension, and the wheels may be steered wheels.

Further, in the above-mentioned first embodiment, the links 14 to 22 are coupled to the suspension member 24 through intermediation of the rubber bush device 38 and the like, and the suspension member 24 is coupled to the vehicle body main part 66 through intermediation of the rubber bush devices 76. However, the suspension member may directly be coupled to the vehicle body main part 66 without the interposition of the rubber bush devices, and the suspension arms such as the links 14 to 22 may directly be coupled to the vehicle body without the interposition of the suspension member.

The invention claimed is:

1. A vehicle suspension, which is to be applied to a vehicle including a vehicle body that is electrically insulated from a ground by a tire having low conductivity and is electrified with positive electric charge through travel, the vehicle suspension comprising:
  a wheel support component; and
  a suspension component coupled to the wheel support component and the vehicle body,
  wherein a joint device for permitting a relative angle change of a coupled component is interposed in at least one of a coupling part between the vehicle body and the suspension component or a coupling part between the suspension component and the wheel support component,
  wherein a self-discharge charge eliminator is provided on a surface of a specific component, which is at least one of the vehicle body, the suspension component, the wheel support component, or the joint device,
  wherein the self-discharge charge eliminator comprises a conductive metal foil having a large number of minute protrusions and recesses on a side surface of an outer periphery of the conductive metal foil: and a layer of a pressure-sensitive adhesive applied to one surface of the metal foil, and the self-discharge charge eliminator is fixed to the specific component by bonding of the layer of the pressure-sensitive adhesive, and
  wherein the self-discharge charge eliminator comprises an air-ion conversion self-discharge charge eliminator which is configured to diselectrify the specific component by changing air around the self-discharge charge eliminator to a negative air ion in accordance with a charge amount of positive electric charge with which the specific component is electrified and attracting the negative air ion to the positive electric charge of the specific component to neutralize the specific component, to thereby decrease the charge amount of the specific component and decrease a charge amount of the joint device.

2. The vehicle suspension according to claim 1,
  wherein the suspension component comprises a suspension arm,
  wherein the joint device comprises a bush device, which is interposed in a coupling part between the vehicle body and the suspension arm and incorporates a elastic component, and
  wherein the self-discharge charge eliminator is provided on a surface of at least one of the vehicle body, the suspension arm, or the bush device.

3. The vehicle suspension according to claim 2,
  wherein a cover made of resin is mounted to the suspension arm,
  wherein a third auxiliary self-discharge charge eliminator is provided on a surface of the cover, and
  wherein the third auxiliary self-discharge charge eliminator comprises the air-ion conversion self-discharge charge eliminator.

4. The vehicle suspension according to claim 1,
  wherein the suspension component comprises a suspension arm,
  wherein the joint device comprises a bush device, which is interposed in a coupling part between the suspension arm and the wheel support component and incorporates a elastic component, and
  wherein the self-discharge charge eliminator is provided on a surface of at least one of the suspension arm, the wheel support component, or the bush device.

5. The vehicle suspension according to claim 1,
  wherein the vehicle body comprises a vehicle body main part and a sub frame coupled to the vehicle body main part,
  wherein the suspension component comprises a suspension arm coupled to the sub frame,
  wherein the joint device comprises a bush device, which is interposed in a coupling part between the sub frame and the suspension arm and incorporates a elastic component, and
  wherein the self-discharge charge eliminator is provided on a surface of at least one of the sub frame, the suspension arm, or the bush device.

6. The vehicle suspension according to claim 5,
  wherein a first auxiliary bush device incorporating a elastic component is interposed in a coupling part between the vehicle body main part and the sub frame,
  wherein a first auxiliary self-discharge charge eliminator is provided on a surface of at least one of the vehicle body main part, the sub frame, or the first auxiliary bush device, and
  wherein the first auxiliary self-discharge charge eliminator comprises the air-ion conversion self-discharge charge eliminator.

7. The vehicle suspension according to claim 5,
  wherein a differential device is coupled to the sub frame,
  wherein a second auxiliary bush device incorporating a elastic component is interposed in a coupling part between the sub frame and the differential device,
  wherein a second auxiliary self-discharge charge eliminator is provided on a surface of at least one of the sub frame, the differential device, or the second auxiliary bush device, and
  wherein the second auxiliary self-discharge charge eliminator comprises the air-ion conversion self-discharge charge eliminator.

8. The vehicle suspension according to claim 1,
  wherein the suspension component comprises a suspension arm, wherein the joint device comprises a ball joint which is interposed in at least one of a coupling part between the vehicle body and the suspension arm or a coupling part between the suspension arm and the wheel support component, and wherein the self-discharge charge eliminator is provided on a surface of at least one of the suspension arm, the wheel support component, or the ball joint.

9. The vehicle suspension according to claim 1, wherein the suspension component comprises a suspension arm, wherein the joint device comprises a spherical bearing, which is interposed in at least one of a coupling part between the vehicle body and the suspension arm or a coupling part between the suspension arm and the wheel support component, and wherein the self-discharge charge eliminator is provided on a surface of at least one of the suspension arm, the wheel support component, or the spherical bearing.

* * * * *